(12) United States Patent
Shima

(10) Patent No.: US 6,369,909 B1
(45) Date of Patent: Apr. 9, 2002

(54) PRINT SYSTEM, PRINTING METHOD, AND PRINTER

(75) Inventor: Toshihiro Shima, Nagano (JP)

(73) Assignee: Seiko Epson Corporation, Tokyo (JP)

( * ) Notice: Subject to any disclaimer, the term of this patent is extended or adjusted under 35 U.S.C. 154(b) by 0 days.

(21) Appl. No.: 09/556,519

(22) Filed: Apr. 21, 2000

Related U.S. Application Data

(62) Division of application No. 09/121,860, filed on Jul. 24, 1998.

(30) Foreign Application Priority Data

| Jul. 25, 1997 | (JP) | ............................................. 9-199555 |
| Sep. 4, 1997 | (JP) | ............................................. 9-239395 |
| Oct. 2, 1997 | (JP) | ............................................. 9-269755 |
| Oct. 17, 1997 | (JP) | ............................................. 9-285069 |
| Jun. 18, 1998 | (JP) | ......................................... 10-170822 |

(51) Int. Cl.[7] .............................................. G06K 15/02
(52) U.S. Cl. ...................... 358/1.15; 358/1.13; 358/468
(58) Field of Search ............................... 358/1.13, 1.14, 358/1.15, 1.16, 407, 448, 468, 540, 401, 1.1, 1.4

(56) References Cited

U.S. PATENT DOCUMENTS

| 5,828,817 A | * | 10/1998 | Landau | ...................... 358/1.13 |
| 5,970,216 A | * | 10/1999 | Tanio et al. | ................ 358/1.13 |
| 5,978,563 A | * | 11/1999 | Kawamoto et al. | ........ 358/1.13 |
| 5,987,226 A | * | 11/1999 | Ishikawa et al. | ........... 358/1.13 |
| 6,035,149 A | * | 3/2000 | Akashi et al. | ............. 358/1.13 |

FOREIGN PATENT DOCUMENTS

| EP | A1 0 738 949 | 10/1996 | ............. G06F/3/00 |
| EP | A1 0 772 114 | 5/1997 | ............. G06F/3/12 |
| WO | WO 96/01449 | 1/1996 | ............. G06F/3/12 |
| WO | WO 96/01456 | 1/1996 | .......... G06K/15/00 |

* cited by examiner

*Primary Examiner*—Mark Wallerson
(74) *Attorney, Agent, or Firm*—Sughrue Mion, PLLC

(57) ABSTRACT

Network-incompatible low-function printers 3A, 3B, . . . incapable of interpreting a high-function language are connected to a high-function printer 2 which can connect to a network 4 and which can interpret a high-function language such as PostScript, in such a way as to be positioned in a downstream location relative to the printer 2, thereby constituting one printer group. The high-function printer 2 examines the performance attributes of the downstream low-function printers 3A 3B, . . . and stores the thus-examined performance. The printer 2 notifies the performance attributes of the overall printer group to a host provided on the network 4. On the basis of the thus-notified performance, a printer drive provided in the host prepares and displays a user interface screen. Upon receipt of print job data from the host, the high-function printer 2 selects a printer suitable for processing the job from the printer group and transfers the job data to the thus-selected printer.

27 Claims, 21 Drawing Sheets

| IP ADDRESSES | TRANSFER DESTINATION |
| --- | --- |
| 163, 141, 22, 1 | PRINTER ITSELF |
| "            3 | S SERIAL |
| "            4 | P PARALLEL |
| "            6 | USB |

*FIG. 21*

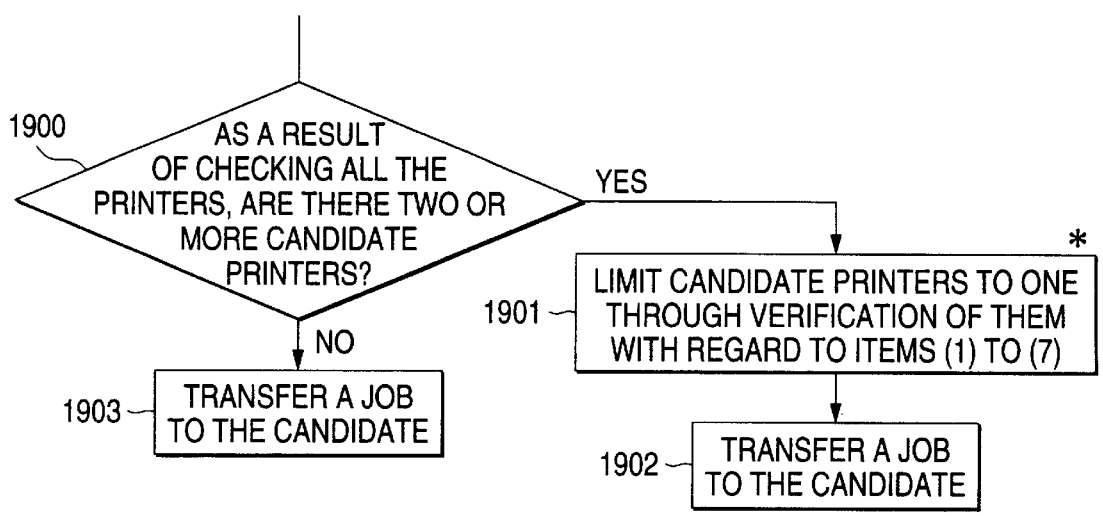

\*
(1), ELIMINATE A PRINTER BEING CURRENTLY USED
(2), ELIMINATE A PRINTER HAVING A SMALLER AMOUNT OF REMAINING TONER OR PAPER
(3), ELIMINATE A PRINTER HAVING A GREATER NUMBER OF TIMES IT IS USED
(4), ELIMINATE A PRINTER WHICH INCURS GREATER COST FOR CONSUMABLES
(5), ELIMINATE A COLOR PRINTER WHEN MONOCHROME IS SPECIFIED
(6), ELIMINATE A HIGH-RESOLUTION PRINTER WHEN LOW-RESOLUTION IS SPECIFIED
(7), ELIMINATE A PRINTER LOCATED PHYSICALLY DISTANT

PRINT SYSTEM, PRINTING METHOD, AND PRINTER

This is a divisional of application Ser. No. 09/121,860 filed Jul. 24, 1998, the disclosure of which is incorporated herein by reference.

BACKGROUND OF THE INVENTION

The present invention generally relates to a digital printer and a technique for utilizing a printer, and more particularly, to a technique for realizing harmonious use of a plurality of printers which differ from one another in terms of a language interpretation capability, a network communications function, or a rendering capability, for using an underperforming printer in the same manner as a high-performance printer, or for causing a plurality of printers to complement to one another with regard to performance deficiencies.

Various languages have been developed for use in describing print commands supplied to a printer from a host computer. Of these languages, some, such as a page description language "PostScript™" of Adobe Systems Incorporated in the U.S., have a very versatile expression capability and are capable of freely expressing complicated graphics which cannot be described by any other language. So long as such a high-function, high-level language is employed, complicated graphics can be printed beautifully at high speed. To this end, the printer must have a function of being able to interpret and render the high-function language. However, a printer capable of interpreting a high-function language such as PostScript is more expensive than a printer capable of interpreting solely a lower-function language. In a case where there are used a plurality of printers connected to a communications network, e.g., a LAN, if printers compatible with a high-function language are selected for all the printers, a very high cost will be incurred at the time of introduction of the printers.

When a plurality of printers are connected to the network, the following problem will arise. More specifically, provided that a plurality of types of printers (e.g., page printers and serial printers) are connected to the network or that a plurality of printers produced by different manufacturers are connected to the network, the language that can be interpreted differs from printer to printer. For this reason, the user of the host computer is required to determine beforehand a printer which he desires to use and to select a language (in effect, a printer driver) suitable for the printer. However, so long as print quality is guaranteed, use of any printer poses no problems for the user. Accordingly, it is convenient for the user to utilize various printers under a unified method without consideration of the type of printer or printer driver.

In an existing communications network, e.g., the Internet, one terminal is usually assigned one IP address. Communication between network-compatible terminals, each of which has an IP address and a TCP/IP execution function, form the basis of the network.

For example, in a case where all the printers disposed in an office are to be connected to the Internet, there are many types of existing printers which cannot be directly connected to the Internet, and hence an expensive network adapter must be attached to each of these printers, resulting in a considerably large economic burden. Further, there are many types of existing printers incapable of operating with the network.

The foregoing problem may be expressed in terms of a more general problem: that is, a plurality of terminals including both network-incompatible terminals and network-compatible terminals are collected into one group (e.g., all the printers disposed in an office are collected into one group), and no existing means provides a relay function capable of connecting the entire group to a network.

With regard to a relay function related to the network, in an existing line there is provided a router which performs a relaying operation called a routing operation (e.g., selection of a communications path, data exchange between adjacent networks, and management of IP addresses of the network) for routing data transferred over the Internet to a desired terminal. However, since the router is intended to relay data between domains within the Internet, the router cannot serve as means for solving the problem, i.e., means for connecting to a network a group including network-incompatible terminals such as those mentioned previously.

A document—which is supplied via WWW service over the Internet and which is written in, e.g., HTML,—is a composite document comprising text characters and another type of resource, such as audio, a dynamic image, or a static image, embedded into the text characters. A plurality of types of resources are incorporated into such a composite document in their respective unique file formats. For example, a character file is incorporated in a text format, a HTML format, or a file format unique to an application used for preparing the file: a static image is incorporated into a composite document in a JPEG or GIF format; and a dynamic image is incorporated into a composite document in an MPEG format.

An existing printer is provided with a mere renderer (i.e., a module for performing a rendering operation or preparing a print image of a document) corresponding to a certain printer control language. In an existing print system comprising an existing printer connected to a host computer, when a composite document such as that mentioned previously is printed, the host computer interprets the file format of each resource contained in the composite document. The host computer converts document data into data expressed in a specific printer control language understandable to the printer and transfers the thus-converted print data to the printer. The printer interprets the data expressed in the specific printer control language and prepares and prints a print image of the document.

As mentioned above, an existing printer can understand only data expressed in a specific printer control language. In a case where data regarding a composite document are printed, the host computer must interpret various file formats contained in a composite document and convert the file formats into data described in the printer control language. However, in the case of a network-compatible printer capable of being connected to a network such as the Internet, the printer has the function of following a network communications protocol such as TCP/IP. Accordingly, if the printer can interpret and print a composite document capable of being transferred according to the communications protocol, great convenience is afforded to the user.

SUMMARY OF THE INVENTION

Accordingly, an object of the present invention is to enable economic and convenient utilization of a plurality of printers which differ from one another in terms of language interpretation capability, a network communications function, and a rendering capability.

Another object of the present invention is to provide an economic technique for enabling an underperforming printer to be used in the same manner as a high-performance printer.

Yet another object of the present invention is to enable unified control of a plurality of printers capable of interpreting different languages through use of a single language.

Still another object of the present invention is to enable a printer which cannot interpret a high-function language to be used in the same manner as a printer capable of interpreting a high-function language.

A further object of the present invention is to enable free use of a plurality of printers through a simple and inexpensive scheme.

A still further object of the present invention is to enable setting of a plurality of different types of printers through use of a single printer driver.

Another object of the present invention is to enable devices which are difficult to solely connect to a network, e.g., one or more network-incompatible printer, to be connected to a network in a grouped manner.

Still another object of the present invention is to enable incorporation of network-incompatible printers into a network through a simple and inexpensive scheme.

Yet another object of the present invention is to provide a printer capable of receiving and printing a composite document containing a plurality of resources of various file formats or an environment substantially capable of realizing such a printer.

According to one aspect of the present invention, there is provided a print system comprising:

a proxy server which converts a fist print command written in a first language into a second print command written in a second language; and at least one printer which receives the second print command from the proxy server, interprets the received command, and performs a printing operation.

In this print system, a printer is connected to a proxy server. The printer may be connected to the proxy server in any of several forms, e.g., one printer may be connected to one proxy server, or a plurality of printers may be connected to one proxy server. Alternatively, a plurality of printers may be connected to a plurality of proxy servers, or a printer may be connected to a proxy server by means of a specifically-designed cable or by means of a network. Upon receipt of a print command of a first language, e.g., PostScript, the proxy server converts the thus-received print command into a print command of a second language which the printer can interpret and sends the print command of the second language to the printer. Upon receipt of the print command of the second language, the printer interprets the print command and performs a printing operation. As a result, even if the printer cannot actually interpret the first language, from the outside the printer appears to be substantially equivalent to a printer corresponding to a first language.

Preferably, the proxy server is a printer.

According to a second aspect of the present invention, there is provided a printing method comprising:

a step of converting a first print command written in a first language into a second print command written in a second language; and a step of transferring the thus-converted second print command to a printer capable of interpreting the second language.

According to a third aspect of the present invention, there is provided a proxy server comprising:

command conversion means for converting a first print command written in a first language into a second print command written in a second language; and transfer means which can be connected to at least one printer and which transfers the second print command to the connected printer from the command conversion means.

According to a fourth aspect of the present invention, there is provided a proxy server which can connect a host device capable of interpreting a first language to a printer capable of interpreting a second language, the server comprising:

conversion means which receives from the printer a first status message representing a printer status written in the second language and which converts the first status message into a second status message written in the first language; and transfer means for transferring the second status message to the host device from the conversion means.

According to a fifth aspect of the present invention, there is provided a printer comprising:

print means which performs a printing operation by interpretation of a first print command written in a first language;

conversion means which converts the first print command into a second print command written in a second language; and transfer means which can connect the printer to at least one other printer capable of interpreting the second language and which transfers the second print command to the connected printer from the command conversion means.

In one preferred embodiment, the printer according to the present invention renders a primitive raster image by interpretation of the first print command and prepares the second print command by incorporation of the data—including the raster image produced through rendering—into the format of the print command of the second language. For this reason, the capability of expression in the first language is utilized when another printer connected to the printer performs a printing operation. Accordingly, in a case where the first language is a high-function language such as PostScript, there is obtained a high quality print result reflecting the high expression capability.

In the foregoing embodiment, the printer according to the present invention has means for selecting the second language from a plurality of predetermined languages. In a case where another printer is newly connected to the printer, where the printer is modified, or where another printer is added to the printer, the second language is selected according to the type of thus-connected printer. Accordingly, the thus-connected printer can perform a printing operation without fail.

In the foregoing embodiment, the printer according to the present invention can be connected to a plurality of other printers and selects from the printers a printer which is to perform a printing operation. A language which the thus-selected printer can interpret is determined, and the first print command is converted into a print command of the thus-determined language. The print command is then sent to the selected printer. For example, if a print command designates a destination printer, the thus-designated printer may be selected as a printer which is to perform a printing operation. Alternatively, if no printer is specified as a destination, a desired printer may be selected from the printers remaining in a standby condition. In any event, a language corresponding to the selected printer is determined, and the print command is converted into the thus-determined language. Accordingly, the selected printer is to perform a printing operation without fail, and a plurality of printers can be controlled in a unified manner through use of a first language.

In the foregoing embodiment, the first language is a high-function language, such as PostScript, having superior image expression capability. In contrast, the second language is a low-function language having a low-function image expression capability. Accordingly, so long as there is provided at least one printer compatible with a high-function language, a print system compatible with a high-function language can be established by connection of low-function printers—which are not compatible with a high-level language—to the high-function compatible printer.

Further, in the foregoing embodiment, the printer according to the present invention has selection means for determining whether to print data by itself or to transfer a converted command to another printer. For example, if a received print command includes a printer designated as a destination and if the destination printer is the printer itself, the printer prints data by itself. In contrast, the destination printer is another printer, a converted print command is transferred to the printer. Alternatively, in a case where the printer according to the present invention is specifically designed to print a monochrome image, the printer prints data by itself, so long as the received print command specifies a monochrome print. In contrast, if the received print command specifies a color print, another printer capable of producing a color print is selected, and a converted print command is transferred to that printer. In the latter case, for example, in a case where the printer according to the present invention is a monochrome laser printer compatible with PostScript, so long as an inexpensive color printer (e.g., a color ink-jet printer) is connected to the laser printer, a result which is substantially equivalent to that of a PostScript-compatible color printer can be obtained inexpensively.

According to a sixth aspect of the present invention, there is provided a printer which can connect a first external device capable interpreting a first language to a second external device capable of interpreting a second language, the printer comprising at least one of first conversion and transfer means for converting information, which is written in the first language and is received from the first external device, into information written in the second language and for transferring the information written in the second language to the second external device; and second conversion and transfer means for converting information, which is received from the second external device and is written in the second language, into information written in the first language and for transferring the information written in the first language to the first external device.

According to a seventh aspect of the present invention, there is provided a printer which can connect to a host device and another printer, the printer comprising:

a proxy server serving as proxy for another printer, in relation to the host device.

According to an eighth aspect of the present invention, there is provided a local router comprising:

network communications means which can connect to a communications network and has a plurality of network addresses representing a plurality of locations on the network and which responds to a communications message addressed to any of the plurality of network addresses; and data transfer means which can transfer the data included in a communications message addressed to any of the plurality of network addresses to a plurality of destinations and selects destinations of the data according to the network address of the communication message.

So long as a network-incompatible device (e.g., a printer) is connected to the local router as a destination of the data, the local router performs communications processing related to the network and serves as a proxy for the network-incompatible device. The data received from the network are transferred to the network-incompatible device. From the viewpoint of the network, the network-incompatible device appears to be a network-compatible device. As mentioned above, the network-incompatible device can connect to the network.

According to a ninth aspect of the present invention, there is provided a network printer which doubles as the local router and has print processing means as at least one of the destinations of the data.

According to a tenth aspect of the present invention, there is provided a network printer which can connect to a communications network and other devices and which has all network addresses assigned to a group of devices including the network printer and other devices connected thereto, the network printer comprising:

means for relaying communication between the host and the plurality of devices pertaining to the device group, in response to communication which is sent from the host provided on the network and which includes any of all the network addresses of the devices pertaining to the device group.

With regard to the printers defined in the ninth and tenth aspects of the present invention, so long as another network-incompatible device (e.g., a printer) is connected to the network printer, the network printer performs all communications processing operations relative to the network as a proxy for another network-incompatible device, in relation to the network, and performs communications processing operations for the network printer itself relative to the network. Data are processed by the network printer or transferred to another network-incompatible device according to a communications address of the data. Accordingly, in addition to the network printer, a network-incompatible device which cannot be solely connected to the network is connected to the network as a part of a group. Although the network printer is a single physical printer, it can act as a plurality of network-compatible devices assigned a plurality of network addresses.

According to an eleventh aspect of the present invention, there is provided a network printer which receives a print request from a host over a communications network and which can process the thus-received print request in many forms, the network printer comprising means for selecting according to the detail of the received print request a mode in which the print request is processed. In the foregoing network printer, according to the details of the print request received from the host (e.g., a network address representing a device to which the print request is addressed or a port address representing an application to which the print request is addressed), a mode in which the print request is processed can be selected from a plurality of processing modes (e.g., selection of a security level, selection of paper size, selection of either a color print or a monochrome print, or selection of a printer which performs a printing operation according to the print request in a case where other printers are connected to the network printer). Accordingly, from the viewpoint of the host, a single physical printer can act as a plurality of network-compatible printers.

The foregoing characteristic functional means of the local router and that of the printer can be typically implemented by means of a computer. A computer program for operating the computer and serving as such functional means can be supplied to the computer via any of various mediums, such as a disk-type storage device, a semiconductor storage device, or a communications line.

As a matter of course, the term "network address" used herein implies an address for specifying a node on the network. However, attention should be paid to the fact that the term also implies information which specifies the location of a certain node within the device, a port, a process, and the type of processing. For example, according to TCP/IP protocol, an IP address processed within the layer of a network is a typical network address. However, a port number processed in the layer of a transport or an identifier processed in the layer of an application, for example, is also one type of network address used herein.

According to a twelfth aspect of the present invention, there is provided a printer comprising:

host connection means for connecting to a host;

printer connection means for connecting to another printer; and transfer means for transferring print job data received from the host to another printer connected to the printer. The host is connected to the printer, and another printer is also connected to the printer. Accordingly, the host can utilize a plurality of printers including the printer and another printer connected thereto.

The printer according to the present invention can have network connection means which connects to a network and which communicates with a host provided on the network. As a result, the host provided on the network can also utilize another printer through the network. In short, another network-incompatible printer can be connected to the network.

The printer according to the present invention can be further provided with performance examination means for examining the performance attributes of other printers connected to the printer. As a result, the printer becomes able to manage other printers on the basis of their performances determined through examination. For example, conceivable specific management functions include the performance attribute notification function of notifying the host of the performances of other printers and that of the printer itself, all of which have been examined, or a determination and transfer function of determining which of a group of printers including the printer itself and other printers is to process the print job data received from the host, on the basis of the performances of other printers and the performance attributes of the printer itself. If the printer is provided with the performance attribute notification function, a printer driver of the host can respond to the performance attributes of the printer group. In contrast, if the printer is provided with the determination and transfer function, a printer suitable for printing a print job automatically prints a print job even if the printer driver of the host does not specify any particular printer. As a matter of course, the printer according to the present invention may also be provided with a function of transferring job data to a printer specified by the printer driver.

The printer according to the present invention may be provided with the aforementioned means from the beginning. However, the printer is not necessarily required to have those means. For example, the printer according to the present invention may be implemented by attaching an option including the foregoing means to a printer which does not have those means initially, by loading from an external medium and into a microcomputer provided within the printer a computer program for implementing the means, or by combination of an option and program loading.

In a case where the printer according to the present invention is implemented in the form of a monochrome page printer, there can be inexpensively implemented a print system capable of high-speed monochrome printing and high-speed color printing by connection of a color ink-jet printer to the monochrome page printer. In contrast, in a case where the printer according to the present invention is implemented as a printer compatible with a high expression function language, e.g., PostScript of Adobe Systems; in a case where a standard printer which is not compatible with a high expression function language is connected to the printer; and in a case where the printer according to the present invention performs a rendering operation for the standard printer, there can be inexpensively implemented a print system compatible with a high expression function language.

According to a thirteenth aspect of the present invention, there is provided a printer manager comprising:

host connection means for connecting to a host;

printer connection means for connecting to a printer; and transfer means for transferring print job data received from the host to the connected printer. So long as a host and one or more printers are connected to the printer manager, the host can utilize the printer(s). If the printer manager is further provided with network connection means, a network-incompatible printer can be connected to the network. More preferably, the printer manager is further provided with the previously-mentioned performance examination device.

According to a fourteenth aspect of the present invention, there is provided a printer comprising:

upstream connection means for connecting to an upstream device such as a host or another printer;

downstream connection means for connecting to a downstream device such as yet another printer; and transfer means which transfers print job data received from the upstream device to the downstream device. So long as the upstream printer is connected to the host by connecting the plurality of printers together in the form of a string, the host can utilize the plurality of printers.

Preferably, at least the furthest upstream printer can be provided with network connection means. As a result, network-incompatible printers provided downstream of the furthest upstream printer can be connected to the network.

Preferably, each of the individual printers connected in the form of a string can be provided with performance examination means so that each printer can examine the performance attributes of an adjacent printer provided downstream of the printer.

The printer may be provided with the foregoing means from the beginning. Alternatively, the printer according to the present invention may be implemented by attaching an option to a printer which does not originally have such means or by imparting the means to a printer—which does not originally have such means—through loading of a program.

According to a fifteenth aspect of the present invention, there is provided a print system comprising a printer group including a first printer and other printers connected thereto, and a host having a printer driver for use with the first printer. The first printer comprises receiving means for receiving print job data from the host and transfer means for transferring the thus-received print job data to any of the printers provided within the printer group. According to this print system, the host can utilize printers provided within the printer group.

The first printer is preferably provided with network connection means, thereby enabling connection of the entire printer group to the network.

Preferably, the first printer has performance examination means for examining the performance attributes of other printers.

According to a sixteenth aspect of the present invention, there is provided a printer driver comprising:

means for issuing a performance attribute notification request to a printer;

means which receives the performance attribute notification request from the printer and which prepares a user interface screen according to the notified performance and displays the thus-prepared interface screen; and means for transmitting to the printer data for which there is specified a value selected by the user on the user interface screen. The printer driver enables flexible response according to the performance attributes of a printer. Particularly, the printer driver is suitable as a printer driver for use with a first printer provided within a printer group of the print system according to the present invention.

So long as one printer driver according to the present invention is installed in the host, there is eliminated a need to install into the host a plurality of drivers, each specifically designed for a different type of printers desired to be used. The reason for this is that upon receipt of a performance attribute notification from each of the printers, as required, one printer driver according to the present invention dynamically transforms itself into a driver for each printer and performs display and setting operations.

According to a seventeenth aspect of the present invention, there is provided a printer comprising:

composite document means for receiving or generating composite document data;

a plurality of renderers which correspond to a plurality of predetermined file formats, and which render, among resources included in the composite document data, resources whose file formats correspond to one another;

an image composer which prepares a final print image by integration of rendering results produced by the plurality of renderers; and a print engine for printing the print image.

The printer can print composite document data. Particularly, in a case where the printer is formed as a network-compatible printer capable of being connected to a network such as the Internet, a composite document to be transmitted over the network can be directly received and printed, thus yielding a considerable practical advantage.

Preferably, the printer further comprises a document analyzer. The document analyzer is connected to other devices and identifies the file format of resources included in composite document data. If the composite document data include an incompatible file format which is not compatible with any of the renderers of the printer, the document analyzer transfers a resource of the incompatible file format to another device and requests the device to render the resource. Upon receipt of a rendering result from the device, the document analyzer transfers the thus-received rendering result to the image composer or the renderer of the printer. As a result, the printer can completely print a composite document including a file format which cannot be supported by the printer of interest.

In a case where the printer has device information representing a file format capable of being rendered by another device and where the document analyzer selects a device capable of rendering a resource of incompatible file format by reference to the device information, a resource can be rendered without fail. More preferably, if the printer has means for preparing device information, the printer can cope with a change in the configuration or rendering capability of another device.

The printer may be additionally provided with a function of printing a resource of a file format which cannot be rendered by the printer, by handling the resource as a blank or by replacing the resource with a proxy image, or with a function of rendering and printing solely a resource of a file format specified by the user.

According to an eighteenth aspect of the present invention, there is provided a printer comprising:

a communications interface which connects to one or more devices in a communicable manner;

composite document means for receiving or producing composite document data;

a document analyzer which identifies the file format of resources contained in the composite document data, transfers a resource of at least one file format to a selected device provided in another device, requests the selected device to render the thus-transferred resource, and receives a rendering result from the device;

an image composer for preparing a final print image from the result of such rendering; and a print engine for printing the print image.

Even if the printer does not have a capability of rendering a composite document, the printer can print the composite document by utilization of the rendering capability of another device. As a matter of course, the printer can be provided with several renderers compatible with different file formats. Further, so long as the printer is constituted as a network-compatible printer capable of connecting to a network such as the Internet, the printer can receive a composite document directly from the network and can utilize any of various types of devices disposed on the network, thus resulting in great practical merit.

The printer may be additionally provided with the function of printing a resource of a file format which can be rendered by neither another device nor the printer itself, by handling the resource as a blank or by replacing the resource with another suitable proxy image or with the function of rendering and printing a resource of a file format specified by the user.

According to a nineteenth aspect of the present invention, there is provided a printer server comprising:

a communications interface which connects in a communicable manner to another device including one or more printers;

composite document means for receiving or generating composite document data;

means for selecting from the device a printer which is to print the composite document data; and a document analyzer which identifies the file format of a resource contained in the composite document data and transfers to the thus-selected printer a resource of a file format capable of being rendered by the selected printer, and which supplies to the selected printer a rendering result regarding a resource of a file format incapable of being rendered by the selected printer.

So long as the printer is used in combination with a printer server, even if the printer does not have a capability of rendering a composite document, the printer can print the composite document by utilization of the rendering capability of another device. Particularly, for example, in a case where the printer server is connected to all the printers in an office through a LAN, any of the printers can print a composite document without changing all the printers to composite-document-compatible printers.

The printer server may be implemented in the form of incorporation into the printer according to the present invention. So long as another printer is connected to the printer having the printer server incorporated therein, the printer can print the composite document by itself or can cause another printer to print a composite document. Particularly, so long as the printer is connected to a LAN, there is yielded a great practical merit.

Either of the principal constituent elements of the printer or the printer server according to the present invention; i.e., the renderer or the document analyzer, can be implemented through use of a computer provided in the printer or the printer server. A computer program used for implementing the renderer or the document analyzer can be installed or loaded into the computer from any of various types of mediums such as semiconductor memory, disk storage devices, or a communications network.

The present invention provides a print system constituted by connecting another device to the foregoing printer or printer server. The print system can be implemented in any of various forms, for example, a small-scale print system comprising a host computer connected to a printer in a one-to-one relationship, such as a LAN or WAN, or a large-scale network such as the Internet. Accordingly, the present invention finds widespread applications.

BRIEF DESCRIPTION OF THE DRAWINGS

FIG. 21 shows the flow of processing for determining a printer which is to print a print job when there are two or more printers capable of supporting setting values specified by the job, in the previously-described two embodiments:

DESCRIPTION OF THE PREFERRED EMBODIMENTS

Figure 1:
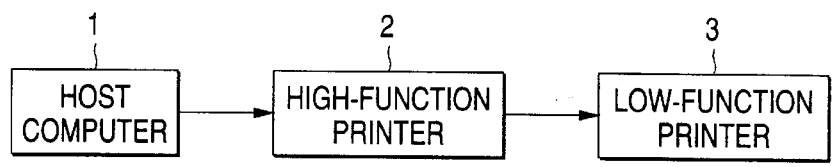
FIG. 1 is a functional block diagram showing a print system according to a first embodiment of the present invention.

FIG. 1 is a functional block diagram showing a print system according to a first embodiment of the present invention.

A host computer 1, e.g., a personal computer, transmits a print command written in (e.g., PostScript) in one predetermined high-function language. A high-function printer 2 is connected to the host computer 1. A low-function printer 3 is connected to this high-function printer 2.

The high-function printer 2 has a rendering function of interpreting a print command which is received from the host computer 1 and which is written in a high-function language and of rendering an image to be printed; a print function of printing the thus-rendered image by itself; a transfer function of converting the thus-rendered image (although the image may be a final band or page image—in this case, an intermediate code of an intermediate code form in terms of a processing efficiency) into a print command format written in a predetermined low-function language which can be interpreted by the low-function printer 2; and a selection function of automatically selecting one from the foregoing two functions (e.g., if the destination of the print command is the printer itself, the print function is selected. In contrast, if the destination is the low-function printer 3, the transfer function is selected). Further, the high-function printer 2 has a status reply function of notifying the host computer 1 of a printer status of the printer itself in the form of a status message written in a high-function language, and a proxy status reply function of receiving from the low-function printer 3 a message in which the printer status of the low-function printer 3 is written in a low-function language and of sending the message to the host computer 1 after converting the message into a status message of a high-function language.

The low-function printer 3 cannot interpret a high-function language but interprets and prints a print command of a low-function language. The low-function printer 3 also has the status replay function of sending to the high-function printer 2 a message in which the printer status of the printer itself in a low-function language.

The low-function language is inferior to the high-function language in terms of expression capability. Usually, the low-function printer 3 which supports only such a low-function language is considerably cheaper than the high-function printer 2 supporting a high-function language.

The operation of the print system according to the first embodiment will now be described. Upon receipt of a print command written in a high-function language from the host computer 1, the high-function printer 2 interprets the thus-received print command. As a result of interpretation, the high-function printer 2 initially recognizes the destination of the print command and renders individual primitives (image elements: that is, individual characters, graphics, patterns, or an aggregate of these elements being spatially linked together) included in each page to be printed, thus preparing intermediate codes for each page. The thus-prepared intermediate codes are temporarily stored in RAM (not shown) of the high-function printer 2. In a case where the destination of the print command is the high-function printer 2, the high-function printer 2 prepares a complete band image from the intermediate codes stored in the RAM and transfers the thus-prepared band image to a print engine (not shown) of the printer 2, thus printing an image. In contrast, in a case where the destination of the print command is the low-function printer 3, the high-function printer 2 incorporates the intermediate codes stored in the RAM into the format of a print command of a low-function language, thus preparing a low-function language print command. The thus-prepared low-function language print command is transferred to the low-function printer 3. The low-function printer 3 interprets the thus-received low-function language print command and renders a print image, thus printing the image.

In response to a request from the host computer 1 (or voluntarily), the high-function printer 2 sends to the host computer 1 the printer status of the printer 2 in the form of a status message written in the high-function language. Further, upon receipt of a status request addressed to the low-function printer 3 from the host computer 1, the high-function printer 2 sends the status request to the low-function printer 3 by converting the status request into a status request of a low-function language. In response to the status request (or voluntarily), the low-function printer 3 sends to the high-function printer 2 the printer status of the printer 3 in the form of a status message written in the low-function language. The high-function printer 2 extracts a printer status from the status message of the low-function language and prepares a status message of a high-function language by incorporation of the printer status received from the printer 3 into the format of a status message of a high-function language. The thus-prepared high-function message is transmitted to the host computer 1.

In a case where the high-function printer 2 performs a printing operation by itself, it goes without saying that there is obtained a high-level print result reflecting a high expression capability of the high-function language. Further, even in a case where a printing operation is performed by means of the low-function printer 3, since the high-function printer 2 converts the high-function language into the low-function language, the host computer 1 enables control of the low-function printer 3 through use of only one high-function language, without being aware of what kind of language the low-function printer 3 can interpret. Further, since the high-function printer 2 renders an image on the basis of the high-function language, a high-level print result can be obtained without deteriorating the high expression capability of the high-function language. The host computer 1 can grasp the printer status of the high-function printer 2, as well as the printer status of the low-function printer 3 by means of the proxy status reply function of the high-function printer 2. In short, the inexpensive low-function printer 3 can yield substantially the same performance as that of the high-function printer 2.

In the case of one modification of the first embodiment: namely, in a case where the high-function printer 2 is, e.g., a laser monochrome printer, a color ink-jet printer, for example, is connected as the low-function printer 3 to the high-function printer 2. If a color print command written in the high-function language is input to the high-function printer 2, the high-function printer 2 prepares intermediate codes of respective color components from the color print command (the only requirement is to repeat a process of preparing a monochrome intermediate code for each color component plain). Further, the intermediate code may be converted into a print command of a low-function language, and the print command may be sent to the color ink-jet printer 3. As a result, there can be effected high-level color printing reflecting a high-function language, which conventionally would be implemented through use of only a high-function color printer (which is considerably expensive at the present time), by means of a low-cost configuration comprising a high-function monochrome printer and a low-function color printer. In such a case, the selection function of the high-function printer 2 responds not to the destination of the print command in the manner as mentioned previously, but to a determination as to whether the print command designate monochrome or color.

In another modification of the first embodiment, the high-function printer 2 may be arranged so as to activate the selection function according to a load of the high-function printer 2 and that of the low-function printer 3 (e.g., if the high-function printer 2 is in the course of a printing operation and the low-function printer 3 is in a standby condition, the transfer function is activated, and in the case of the reverse situation, the print function is selected).

Figure 2:
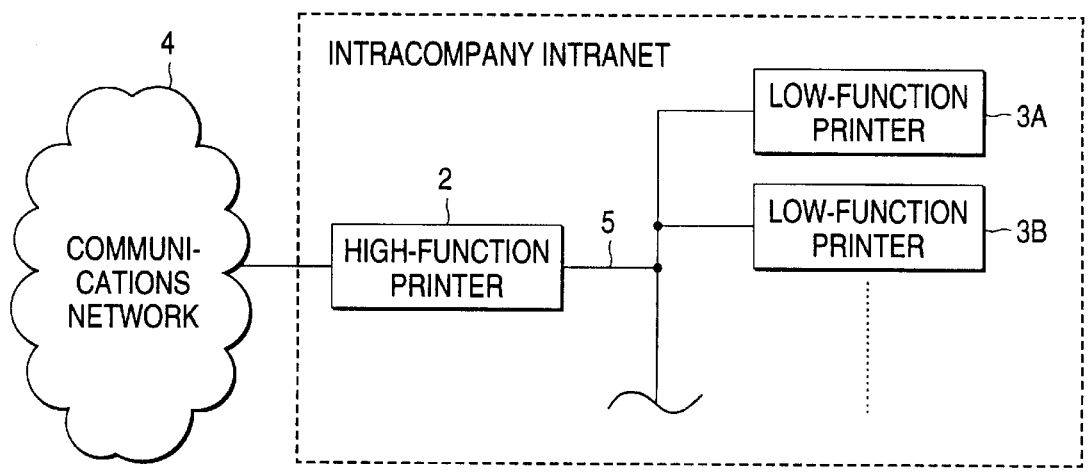
FIG. 2 is a functional block diagram showing a print system according to a second embodiment of the present invention.

In still another modification, in place of the high-function printer 2, there may be used a processing device having the same functions as those of the high-function printer 2 exclusive of the print function. In short, in the present embodiment, the high-function printer 2 acts as a "high-function printer" and a "proxy server" which interprets a high-function language as a proxy for the low-function printer 3, as well. However, in the modification, the processing device acts solely as a "proxy server." FIG. 2 is a functional block diagram showing a print system according to a second embodiment of the present invention. For example, the high-function printer 2 is connected to a plurality of low-function printers 3A, 3B, . . . through an internal communications network 5 such as an intranet within a company. Further, the high-function printer 2 is connected to an external communications network 4, e.g., the Internet. Although not shown in the drawing, it goes without saying that the high-function printer 2 may be connected not only to the low-function printers 3A, 3B, . . . , but also to another high-function printer.

The high-function printer 2 receives a print command written in a high-function language such as PostScript from a host computer (not shown) provided on the external communications network 4 or the internal communications network 5. Upon receipt of the print command, the high-function printer 2 performs a printing operation (activates the print function) by itself on the basis of the received print command or selects one printer from the low-function printers 3A, 3B, . . . and transmits the received print command of the high-function language to the thus-selected low-function printer after having converted the print command into a print command of a low-function language which can be interpreted by the selected low-function printer (i.e., activates the transfer function). In a case where the transfer function is activated, given that the low-function printer 3A responds to, e.g., language A, and the low-function printer 3B responds to, e.g., language B, the high-function printer 2 converts the high-function language print command into a print command of language A when the printer 3A is selected and converts the high-function language print command into a print command of language B when the printer 3B is selected. The high-function language print command is converted into language A or B in the same manner as in the first embodiment shown in FIG. 1.

The high-function printer 2 also has the status reply function and the proxy status reply function, both of which have been mentioned previously. Accordingly, upon receipt of a printer status message written in language A from the printer 3A, the high-function printer 2 converts the message into a printer status message of a high-function language and transmits the thus-converted message to the host computer. In contrast, upon receipt of a printer status message written in language B from the printer 3B, the high-function printer 2 converts the message into a printer status message of a high function language and transmits the thus-converted message to the host computer.

Figure 3:
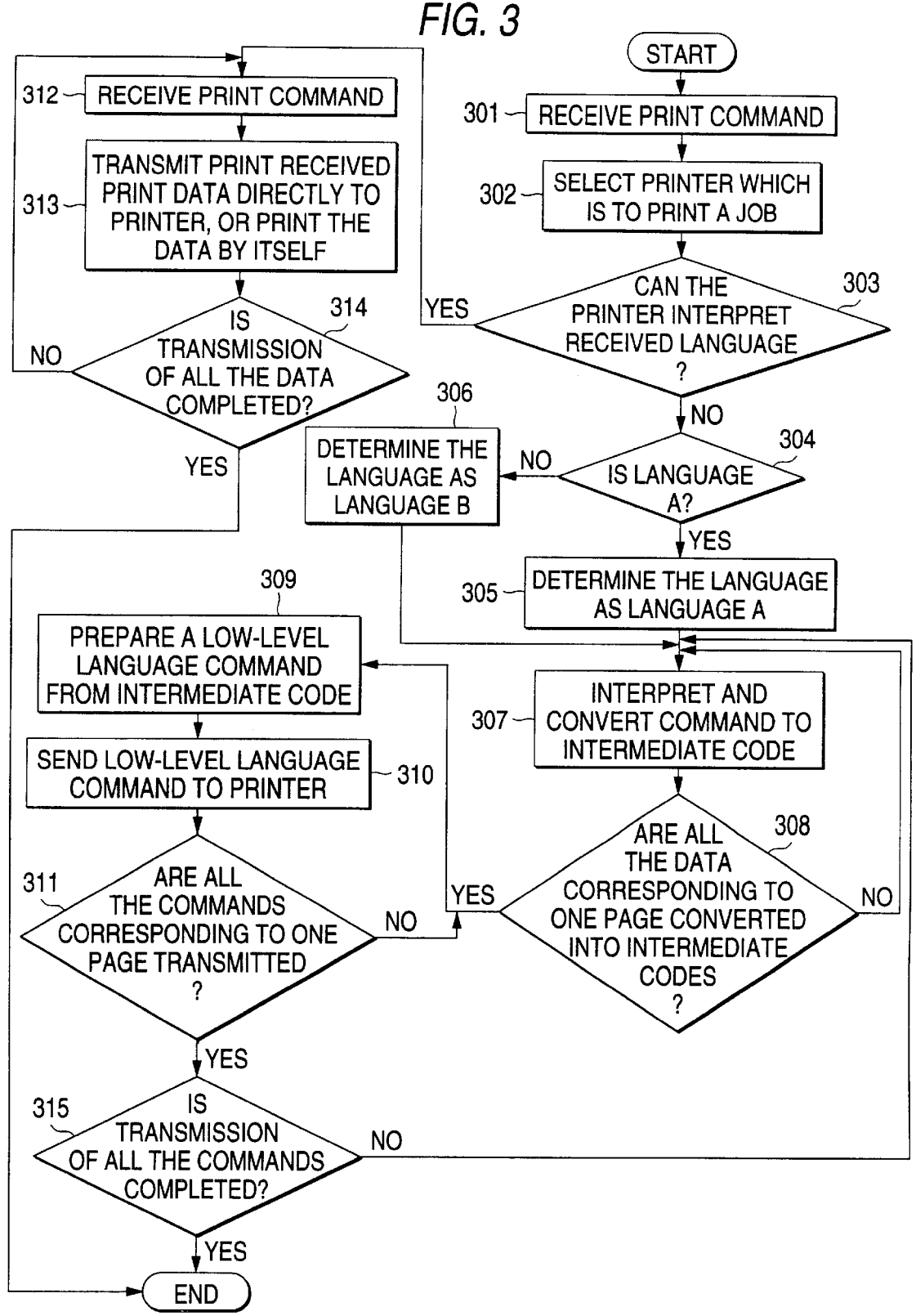
FIG. 3 is a flowchart showing the operation of the print system according to the second embodiment.

The operation of the print system according to the second embodiment will now be described with reference to a flowchart shown in FIG. 3. When receiving a print request from the communications network 4 in step 301, the high-function printer 2 selects in step 302 a printer which is to perform a printing operation. For example, the printer which is to perform a printing operation is selected in the following manner. More specifically, in a case where a destination-printer is selected by a print command, a designated printer is selected. If no printer is specified as a destination, a suitable printer is selected from printers remaining in a standby condition (e.g., a printer is selected from printers remaining in a standby condition in order of precedence or identification number. Alternatively, a printer is selected in decreasing order of frequency of accumulated use). If the print command designates color printing, a printer is inevitably selected from color printers. In contrast, if the print command designates monochrome printing, as often as possible a printer is selected from monochrome printers. If no printers are in a standby condition, an answer message, such as a busy signal, is sent back to the sender of the print command.

In step 303, the high-function printer 2 determines whether or not the selected printer can interpret the high-function language (e.g., PostScript). If the printer can interpret the language (e.g., the high-function printer 2 itself or another high-function printer is selected), the processing proceeds to step 312. If the printer cannot interpret the language (e.g., the low-function printer 3A or 3B is selected), the processing proceeds to step 304. In a case where the processing proceeds to step 312, while receiving a subsequent print command from the communications network 4 the high-function printer 2 transmits the thus-received print command directly to the high-function printer in step 313. In a case where the high-function printer 2 is selected, the high-function printer 2 interprets the print command and generates an intermediate code. Further, the high-function printer 2 produces a band image from the intermediate code and prints the band image. After the operation has been performed through the end of the print command (step 314), the processing is completed.

In contrast, in a case where the processing proceeds to step 304, the high-function printer 2 checks which one of several predetermined low-function languages (e.g., languages A and B) corresponds to the language which can be interpreted by the selected printer. For example, in a case where the predetermined low-function language includes two types of languages, namely, language A and language B, if the result of such check corresponds to language A, the processing proceeds to step 305, and language A is determined to be the target language into which the print command is to be converted. In contrast, the result of such check does not correspond to language A, the processing proceeds to step 306, and language B is determined to be the target language into which the print command is to be converted.

In step 307, while receiving a subsequent print command, the high-function printer 2 interprets the thus-received print command and renders individual primitive raster images, thereby preparing an intermediate code. The thus-prepared intermediate code is temporarily stored in the RAM. In this way, an intermediate code corresponding to one page is prepared (step 308). Next, in step 309, the high-function printer 2 incorporates the intermediate code corresponding to one page into a print command format of the target low-function language determined in step 305 or 306, thereby preparing a print command of the low-function language. In step 310, the high-function printer 2 transmits the thus-prepared print command of the low-function language to the selected printer. As mentioned above, all the intermediate codes corresponding to one page are converted into a print command, and the print command is transmitted to the selected printer (step 311). After having executed the processing defined in steps 307 to 311 through the end of the page (step 315), the high-function printer 2 completes the processing.

The checking operation performed in step 304 can be carried out under a method such as that provided below. One method is to register beforehand languages compatible with the printers 3A, 3B, . . . provided on the network 5 into the high-function printer 2 in the form of, e.g., a table, whereby a language is checked by reference to the thus-registered data. The high-function printer 2 may automatically register compatible languages by inquiring the printers 3A, 3B, . . . about compatible languages. Alternatively, the languages may be manually registered by an operator by way of a keyboard. Another method of checking a language is to inquire a selected printer about a compatible language every time the high-function printer 2 receives a print command. Even in this case, so long as the language checked through inquiry is registered in a table provided within the high-function printer 2 so as to correspond to the printer, if the same printer is selected in subsequent operations a compatible language can be determined by merely referring to the registered data without inquiry.

According to the second embodiment, the plurality of low-function printers 3A, 3B, . . . can be controlled in a unified manner by means of a high-function language. Further, high-level printing operations reflecting a high expression capability of the high-function language can be carried out through use of the low-function printers 3A, 3B, . . . Accordingly, a print system which is analogous, in terms of substantial function, to a print system comprising a plurality of high-function printers can be constructed considerably inexpensively through use of the plurality of low-function printers 3A, 3B, Even in the second embodiment, the high-function printer 2 may be replaced with a specifically-designed "proxy server" having no print function.

Figure 4:
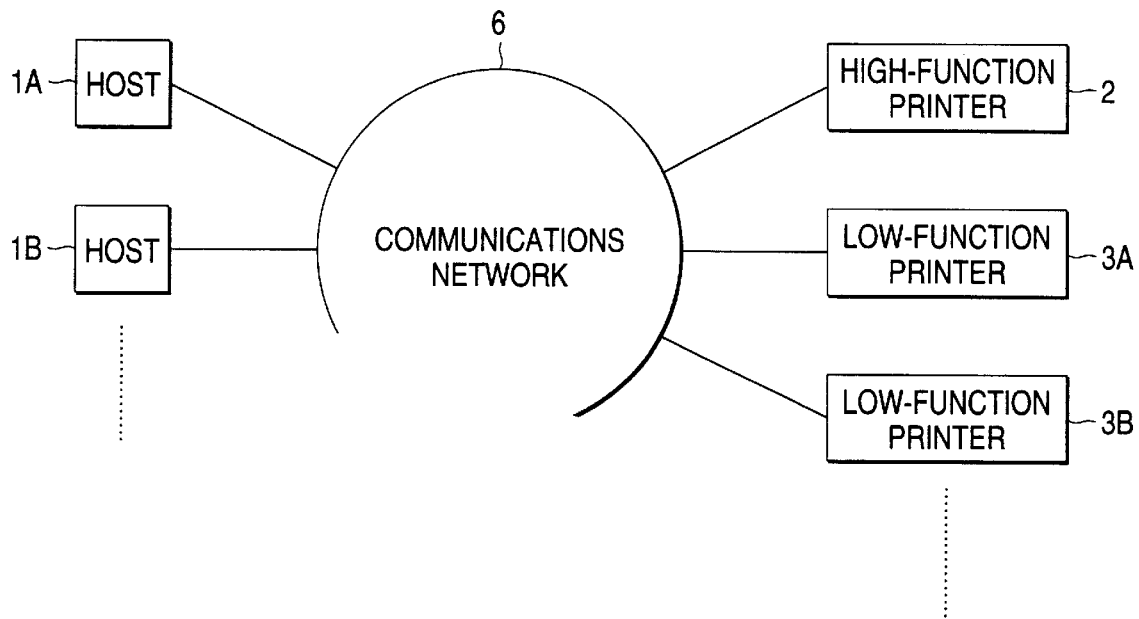
FIG. 4 is a functional block diagram showing a print system according to a third embodiment of the present invention.

As shown in FIG. 4, according to a third embodiment, one communications network 6 (or a plurality of small-scale networks linked together) comprises host computers 1A, 1B, . . . , the high-function printer 2, and various low-function printers 3A, 3B, . . . In such a communications network, as-proxy for the low-function printers 3A, 3B, . . . the high-function printer 2 receives a print command of a high-function language from the host computers 1A, 1B, . . . The thus-received print command is converted into the languages that are compatible with the low-function printers, and the thus-converted languages can be transmitted to the low-function printers.

In the previous embodiment, when the received print command is converted into the language compatible with the selected printer, an intermediate code is prepared from the received print command, and the intermediate code is converted into a command of the target language. However, the method is not necessarily required, and another method may alternatively be employed. For example, a complete band or page raster image is prepared from the intermediate code, and the thus-prepared band or page image may be converted into a command of the target language. Alternatively, a look-up table for command conversion purpose or a command conversion function is prepared beforehand on the basis of the correspondence between languages and commands. The print command may be converted directly into a command of the target language through use of the table or the function. In a case where a command of a high-function language is converted into a command of a low-function language, the latter method may deteriorate the expression capability of the high-function language, thus resulting in a reduction in picture quality. However, the method is suitable for a system according to a modification of the third embodiment, which will be described below, wherein a print command is converted into another language which is equivalent in expression capability to the language of the print command or into another language having a high expression capability.

Further, in each of the embodiments shown in FIGS. 1 through 4, the high-function printer 2 may be replaced with a printer that is compatible with a specific language (e.g., a printer compatible with language A), to replace the low-function printers 3A, 3B, . . . with printers compatible with other various languages, to cause the printer 2 compatible with language A, as a "proxy for another printer," to receive a print command of language A and to transfer the thus-received print command to the printer after having converted the command into the language compatible with the printer. In such a system, even when there exist various types of printers manufactured by various manufacturers, these printers can be controlled in a unified manner through use of one language such as ESC/Page.

Figure 5:
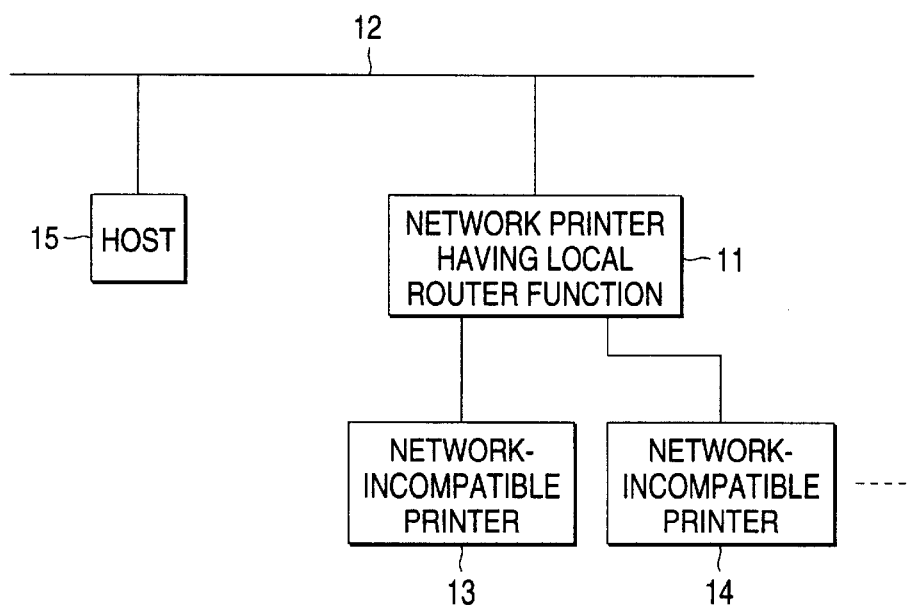
FIG. 5 is a diagrammatic representation showing a communications network which uses a network printer having a local router function according to a fourth embodiment of the present invention.

FIG. 5 is a diagrammatic representation showing a communications network which uses a network printer having a local router function according to a fourth embodiment of the present invention.

In FIG. 5, a network printer 11 having a local router function connects itself to the Internet 12 and is capable of communicating with a host 15. The network printer 11 is connected to one or more network-incompatible printers 13, 14, . . . which cannot connect themselves to the Internet, by way of respective interfaces which are connectable to the printers 13, 14, . . . The network printer 11 has its own IP address and also serves as a printer. Accordingly, the network printer 11 can operate as one terminal printer provided on the Internet 12. In addition, the network printer 11 is also provided with IP addresses of the respective network-incompatible printers 13, 14, . . . connected to the printer 11 and has the function of relaying communication between the printers 13, 14, . . . and the host 15. Accordingly, the network printer 11 can also operate as a local router for the purpose of connecting the group of network-incompatible printers 13, 14, . . . to the Internet 12.

Figure 6:
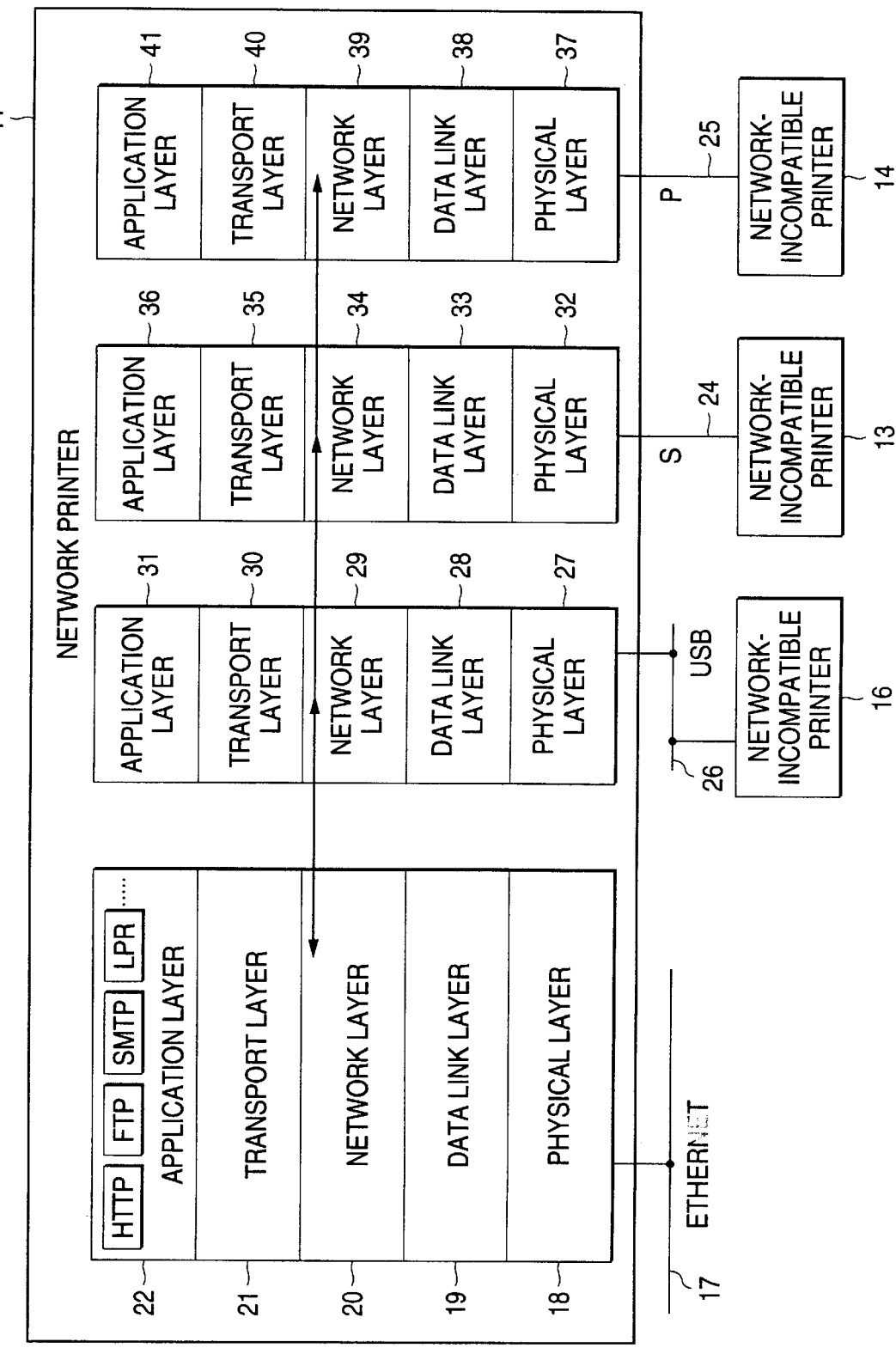
FIG. 6 is a view for describing the relaying function of the network printer shown in FIG. 5 when it serves as a local router.

FIG. 6 is a view for describing the relaying function of the network printer 11 shown in FIG. 5 when it serves as a local router.

The network printer 11 is connected to, e.g., an Ethernet 17 of an office LAN which is a part of the Internet 12. The network printer 11 has a protocol processing section comprising a physical layer 18 constituting a TCP/IP protocol stack for use in communication performed with the Internet 12, a data link layer 19, a network layer 20, a transport layer 21, and an application layer 22 (e.g., HTTP, FTP, SMTP, or LPR).

The network printer 11 has data interfaces such as a serial interface (S) 24, a parallel interface (P) 25, and a universal serial bus (JSB) 26. The plurality of network-incompatible printers 13, 14, 16, . . . can be connected to these data interfaces. The network printer 11 also has a protocol processing section comprising three protocol processing sections, that is, a protocol processing section comprising a physical layer 27 constituting a communications protocol stack for USB26 use, a data link layer 28, a network layer 29, a transport layer 30, and an application layer 31; a protocol processing section comprising a physical layer 32 constituting a data communications protocol stack for use with the serial interface 24, a data link layer 33, a network 34, a transport layer 35, and an application layer 36; and a protocol processing section comprising a physical layer 37 constituting a data communications protocol stack for use with the parallel interface 25, a data link layer 38, a network layer 39, a transport layer 40, and an application layer 41.

In each of the protocol stacks, data are naturally transferred from a lower layer to an upper layer or from an upper layer to a lower layer. In addition, as will be described in detail, data are transferred between the network layer 20 in the TCP/IP protocol stack and the network layers 29, 34, and 39 of the other TCP/IP protocol stacks. As a result, the network-incompatible printers 13, 14, 16, . . . can be connected to the Internet 12.

Figures 7, 8:
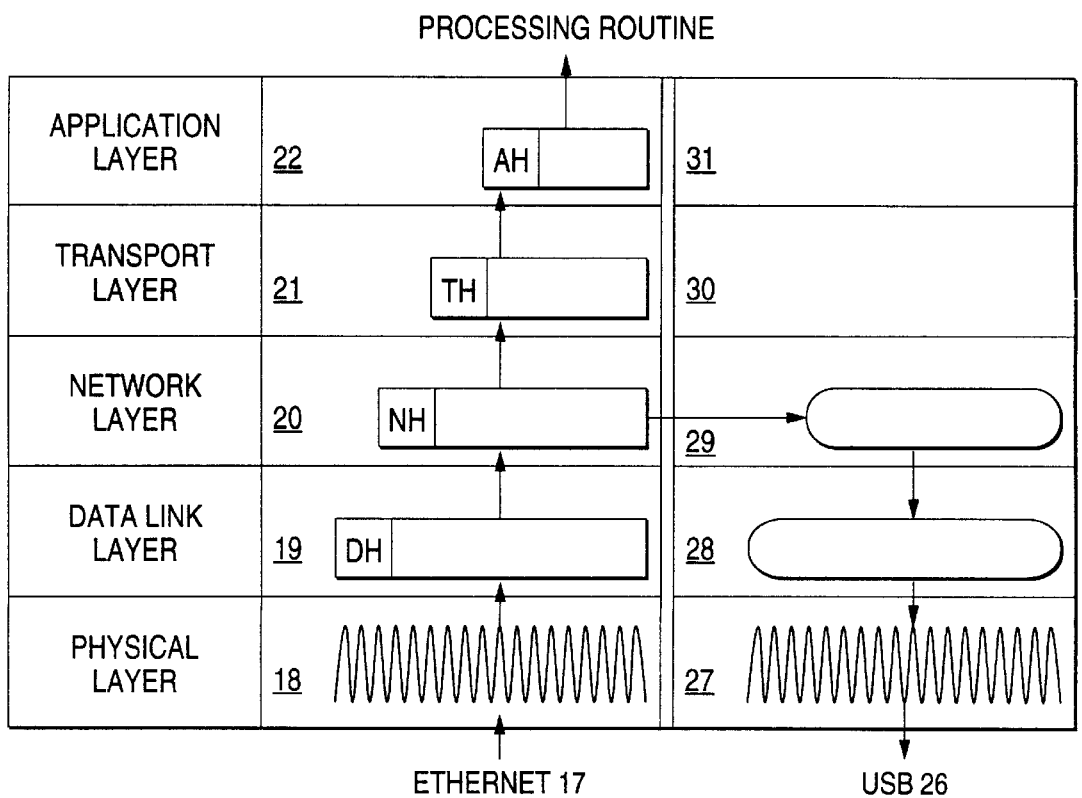
FIG. 7 shows IP addresses of the network printer.
FIG. 8 shows an example in which, since there is a match between the IP address included in the received packet and the IP address of the USB, the received packet is transferred to the network layer of the protocol stack for the USB.

FIG. 7 shows IP addresses of the network printer 11. As shown in FIG. 7, the network printer 11 acquires IP addresses, e.g., "163,141,22,1" to "163,141,22,6" for four printers such as the printer 11 and the other printers 13, 14, and 16. These IP addresses are registered and retained in nonvolatile memory, such as NVRAM, in such a way that the four IP addresses correspond to destinations (e.g., the printer 11, the serial interface 24, the parallel interface 25, and the USB 26) assigned the respective IP addresses. When there is received from the Internet 12 a packet including any of the four IP addresses, the network printer 11 responds to all the received packets. As will be described later, if the IP address of the received packet designates the printer 11, the data contained in the packet are processed by means of the printer 11 itself In contrast, if the IP address of the received packet designates another destination (S, P, and USB), the packet is transferred to a corresponding destination.

Such processing will be performed by means of a configuration shown in FIG. 6.

A packet issued from the host 15 arrives at the network printer 11 by way of the Ethernet 17. As shown in FIG. 8, the packet is initially converted from an electrical signal into a string of data bits by means of the physical layer 18 of the TCP/IP protocol stack. The thus-converted data bit stream is transferred to the data link layer 19. The data link layer 19 interprets a data link header DH provided in the header of the packet and checks a "MAC address" which is included in the data link header DH and represents destination hardware. At the time of manufacture of the network printer 11, the network printer 11 is assigned a unique, specific "MAC address" on the Internet 12, and the data link layer 19 is aware of this MAC address. If the MAC address of destination hardware included in a received packet matches a specific MAC address assigned to the network printer 11, the data link layer 19 deletes the data link head DH from the received packet and transfers the remaining portion of the packet to the network layer 20.

The network layer 20 interprets the network header NH provided in the header of the packet received from the data link layer 19 and checks whether or not there is a match between the "IP address" which is included in the network header NH and represents a destination device and an "IP address" provided in an IP address list stored in the NVRAM such as that shown in FIG. 7. As a result, if the IP address of the destination device included in the received packet matches the IP address assigned to the network printer 11, the network layer 20 removes the network header NH from the received packet and transfers the remaining portion of the packet to the transport layer 21. In contrast, If there is a match between the IP address of the destination device included in the received packet and the IP address assigned to the serial interface 24, that assigned to the parallel interface 25, or that assigned to the USB 26, the network layer 20 transfers the received packet to the network layer 29, 34, or 39 of the protocol stack for the serial interface 24, the parallel interface 25, or the USB 26. FIG. 8 shows an example in which, since there is a match between the IP address included in the received packet and the IP address of the USB 26, the received packet is transferred to the network layer 29 of the protocol stack for the USB 26. In a case where the network layer 20 of the TCP/IP stack transfers the received packet to the network layer 29, 34, or 39 of another protocol stack, the network layer 20 converts the data format of the packet into a data format which can be handled by the destination network layer 29, 34, or 39. The specific details of the data format depends on actual specifications of the interfaces 24, 25, and 26. Since the data format is publicly known and is not directly relevant to the essence of the present invention, the data format will not be explained in the present specification. Further, the format or specifications of the data or packet used for the other network-incompatible interfaces 24, 25, and 26 is generally simpler than that used for the TCP/IP protocol.

Upon receipt of the packet from the network layer 20, the transport layer 21 of the TCP/IP stack interprets a transport header TH included in the header of the packet and checks a "port number" which is included in the transport header TH and represents a destination application. For example, the TCP/IP protocol system stipulates that a specific port number specify a specific application, e.g., port number 80 designating HTTP, and port number 31 designating FTP. The transport layer 21 is aware of the correspondence between port numbers and applications. Accordingly, if there is a match between the port number of the received packet and the specific port number, the transport layer 21 removes the transport header TH from the received packet and transfers the remaining portion of the packet to an individual protocol (HTTP, FTP, SMTP, or LPR) of the application layer 22 specified by the port number. The individual protocol of the application layer 22 interprets an application header AH of the received packet and removes the application header AH from the packet, thus preparing net data. The thus-prepared net data are transferred to a processing routine (not shown) contained in the application which corresponds to an "identifier" included in the application header AH. The processing routine interprets the thus-received data (typically a print request, i.e., a print command) and performs a printing operation. In such a case, the network printer 11 performs a printing operation.

Upon receipt of the data whose format complies with the network layer 29, 34, or 39 from the network layer 20 of the TCP/IP, the network layer 29, 34, or 39 of the protocol for another interface 26, 24, or 25 transfers the data to the data link layer 28, 33, or 38 of the protocol corresponding to the network. The data link layer 28, 33, or 38 transfers the received data to the physical layer 27, 32, or 37 of the protocol corresponding to the data link layer. The physical layer 27, 32, or 37 converts the data into an electrical signal and transmits the signal to the network-incompatible printer 16, 13, or 14 connected to the protocol stack corresponding to the physical layer. Accordingly, in such a case, the network-incompatible printer 16, 13, or 14 prints the data. Processing performed in each layer at the time of transfer of data from an upper layer to a lower layer within another protocol stack depends on actual specifications of the interface 24, 25, or 26. Such processing is publicly known and is irrelevant to the essence of the present invention. Therefore, the processing is not described herein. However, the processing performed in the protocol layer in the network-incompatible interface 24, 25, or 26 is generally simpler than that performed by the TCP/IP protocol (e.g., the network header is not distinguished from the data link header DH, or the network header NH and the data link header DH are omitted (i.e., they have a length of zero).

In this way, the print request issued from the host 15 and received by the network printer 11 is printed by means of the network printer 11 according to the IP address of the destination included in the print request. Alternatively, the print request is transferred to the network printer 13, 14, or 16, where the print request is subjected to a printing operation.

The data (e.g., a notification of printer status or error) output to the host 15 from the network printer 11 or from the network-incompatible printer 13, 14 or 16 are converted into a packet format of the Internet 12 addressed to the host 15 through a processing flow that is the reverse of that mentioned previously. The thus-converted packet format is sent to the Ethernet 17. In this case, when transferring the data to the network layer 20 of the TCP/IP, the network layer 29, 34, or 39 of the network-incompatible interface protocol converts the format of the data into a packet format handled by the network layer 20 (i.e., into the same format as that of the packet transferred to the network layer 20 from the TCP/IP transport layer 21).

As mentioned previously, any of the network-incompatible printers 13, 14, and 16 can be connected to the Internet 12.

In the fourth embodiment, so long as IP addresses are assigned different priorities within one network printer 11 having a plurality of IP addresses, from the viewpoint of the network one physical network printer can be used as if there existed a plurality of printers having different functions, by changing a security level or a paper size according to a priority, selection of monochrome or color printing, selection of printing of an image or a text, or selection of ordinary printing or confidential printing which requires a password. Further, even in a case where the network printer itself is assigned one IP address, so long as network-incompatible printers connected to the network printer are identified by port numbers, a plurality of printers can be connected to the network through use of one IP address. Further, a local router having only a relaying function such as that mentioned previously can be used in place of the network printers.

In addition to the IP address, another element, e.g., a port number or an identifier, may alternatively be used as the network address. For example, in the configuration shown in FIG. 6, when a packet arrives at a network printer 22 from the Ethernet 17, the following protocol processing can be executed.

(1) The data link layer 19 acquires only a packet addressed to its physical address (i.e., a MAC address).

(2) When finding in a packet received from the data link layer 19 an IP address specifying another printer 13, 14, or 16 (or another interface 24, 25, or 26), the network layer 20 sends the packet to the protocol stack of the specified interface.

(3) When finding in a packet received from the network layer 20 a port number specifying another printer 13, 14, or 16 (or another interface 24, 25, or 26), the transport layer 21 sends the packet to the protocol stack of the specified interface.

(4) When finding in a packet received from the transport layer 21 an identifier specifying another printer 13, 14, or 16 (or another interface 24, 25, or 26), the application layer 22 sends the packet to the protocol stack of the specified interface.

An example of foregoing processing will now be described by reference to a case where an operating system called Windows NT (Microsoft) is used.

First, example (2) will be described. In the configuration shown in FIG. 5, print command data are transmitted twice to the network printer 11 by issue of two different transmission instructions to the operating system from the host 16.

First time: lpr-S 163.141.22.51 print.dat
Second time: lpr-S 163.141.22.52 print.dat These two transmission instructions are addressed to an identical protocol "LPR" and order the operating system to send print command data called "print.dat" to two different IP addresses "163.141.22.51" and "163.141.22.52." If the former IP address is assigned to the network printers and the latter IP address is assigned to another printer, the data transmitted first are printed by means of the network printer 11, and the data transmitted second are transferred to another printer.

Figure 9:
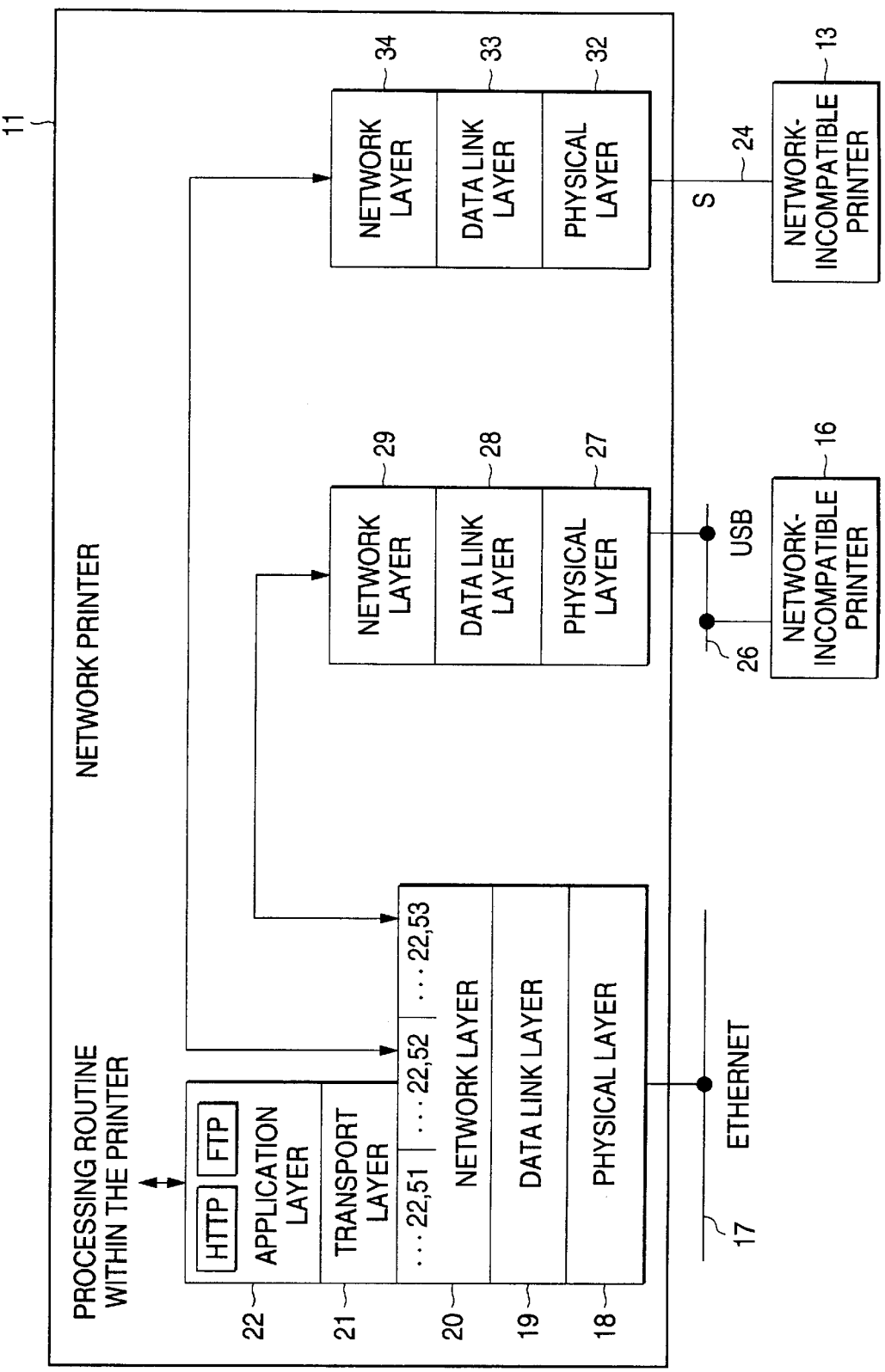
FIG. 9 shows the processing in the printer.

FIG. 9 shows the foregoing processing. The print command data having a destination IP address of "163.141.22.51" are transmitted to a processing routine within the network printer 11. In contrast, the print command data having a destination IP address of "163.141.22.52" or the print command data having a destination address of "163.141.22.53" are transferred to, e.g., the USB 26 and the network layer 29 and 34 of the serial interface, from the network layer 20 of TCP/IP, and are transferred to the network-incompatible printers 26, 24. In this way, when the destination of print command data is determined by the network layer 20 of TCP/IP, the network-incompatible printers 26, 24 which are the destinations of the print command data are required to interpret the TCP/IP application layer protocols (LPR, HTTP, or FTP).

First, example (3) will be described. Print command data are transmitted twice to the network printer 11 by issue of two different transmission instructions from the host 15.

First time: lpr-S 163.141.22.51 print.dat
Second time: ftp163.141.22.51 print.dat The first transmission instruction is addressed to a protocol "LPR" and signifies transmission of data to an IP address of "163.141.22.51," and the second transmission instruction is addressed to a protocol "FTP" and signifies transmission of data to the identical IP address. The packet transmitted first is given a port number "515" assigned to LPR, and the packet transmitted second is given a port number "21" assigned to FTP. Provided that a port number "515" is assigned to the LPR application of the network printer 11, and that a port number "21" is assigned to another printer, the data transmitted first are printed by means of the network printer 11, but the data transmitted second are transferred to another printer.

Figure 10:
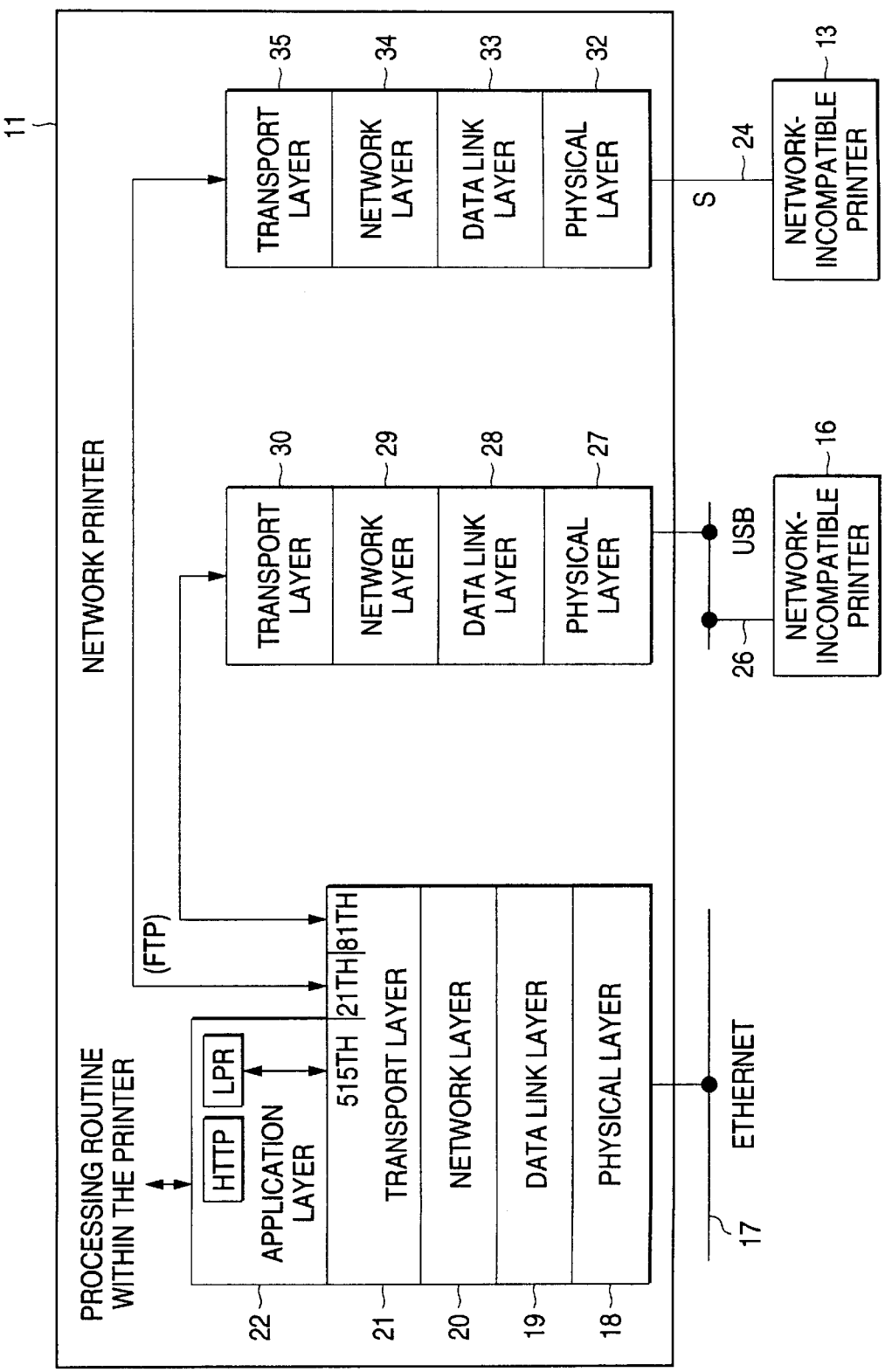
FIG. 10 shows the operations in the printer.

FIG. 10 shows the foregoing operations. The print command data assigned a destination port number "515" are transmitted to a processing routine within the network printer 11. In contrast, the print command data assigned a destination port number "21" or "81" are transferred to, e.g., the USB 26 and the transport layers 30, 35 of the serial interface, from the transport layer 21 of TCP/IP, and are transferred to the network-incompatible printers 26, 24. Even in this case where the destination of print command data is determined by the transport layer of TCP/IP, the network-incompatible printers 26, 24 to which the print command data are transferred are required to interpret a TCP/IP application layer protocol (LPR, HTTP, or FTP).

Nest, example (4) will be described. In this case, print command data are transmitted twice to the network printer 11 by issue of two different transmission instructions from the host 15.

First time: lpr-S 163.141.22.51 -P PRINTER1 print.dat
Second time: lpr-S163.141.22.51 -P PRINTER2 print.dat Both the command data transmitted first and the command data transmitted second are addressed to an identical IP address of a protocol "LPR." However, these print command data specify different data queues "PRINTER1" and "PRINTER2" within the application. The LPR protocol enables management of a plurality of print queues inside the protocol and enables holding of print requests in individual print queues. The designation of the print queues "PRINTER1" and "PRINTER2" are incorporated into the packet as identifiers regarding an application layer. At this time, if the identifier "PRINTER1" is assigned to the network printer 11 and the identifier "PRINTER2" is assigned to another printer, the data transmitted first are printed by means of the network printer 11, but the data transmitted second are transferred to another printer.

Figure 11:
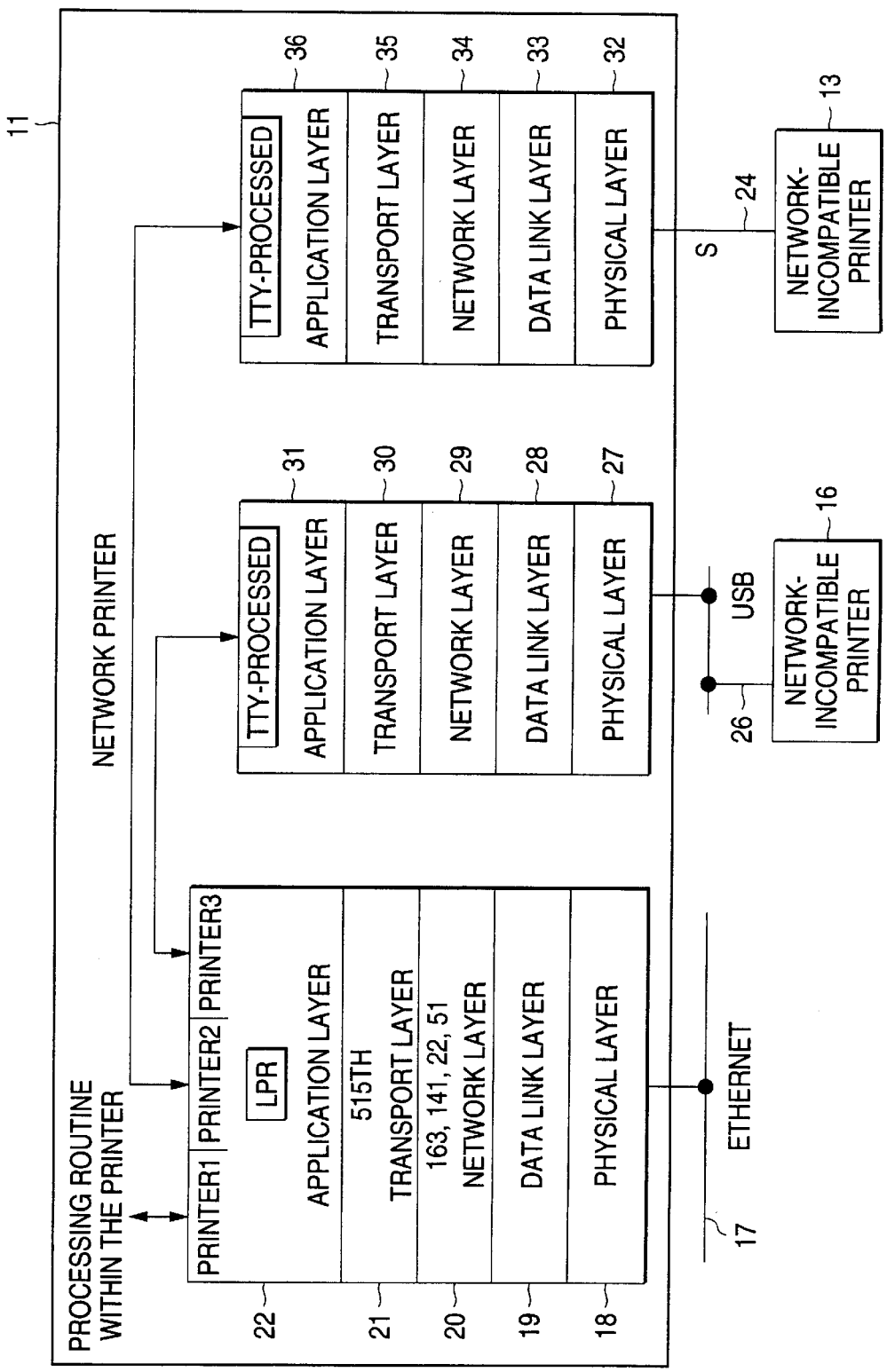
FIG. 11 shows the operations in the printer.

FIG. 11 shows the foregoing operations. The print command data having a destination print queue "PRINTER1" are transmitted to a processing routine within the network printer 11. In contrast, the print command data having a destination print queue of "PRINTER2" and a destination print queue of "PRINTER3" are transferred to, e.g., the USB 26 and a TTY-procedure protocol of application layers 31, 36 of the serial interface, and are transferred to the network printers 26, 24.

The foregoing description is based on a specific hierarchical model which is one logical concept. Accordingly, the configuration of a practical system is not necessarily required to correspond in a one-to-one relationship to the above-mentioned hierarchical model. Within the scope of the gist of the present invention, there may be employed variations on the configuration of the print system, such as a print system including a more detailed hierarchical structure or a print system including two or more strata of the foregoing model in the form of one grouped stratum.

Figure 12:
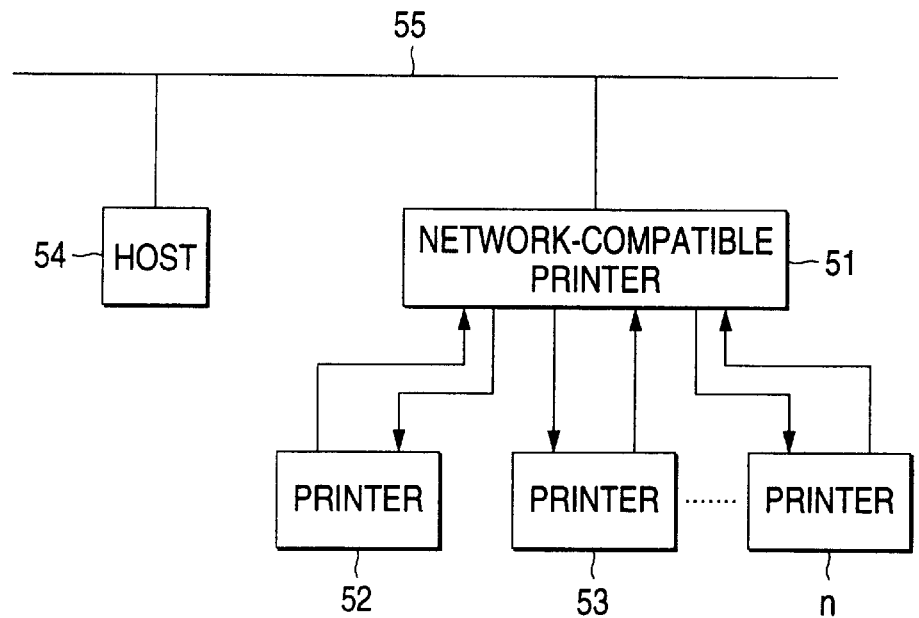
FIG. 12 shows the configuration of a print system according to a fifth embodiment of the present invention.

FIG. 12 shows the configuration of a print system according to a fifth embodiment of the present invention.

In FIG. 12, a network-compatible printer 51 has the function of connecting to a network, e.g., the Internet 55, and communicating with an arbitrary host 54 provided on the Internet 55, through use of a TCP/IP protocol. Further, the network-compatible printer 51 also connects a plurality of network-incompatible printers 52, 53, . . . n, (as a matter of course, network-compatible printers are also usable) and communicates with these printers. For example, the network-compatible printer 51 has a connection port, e.g., a serial interface or a parallel interface. Throughout the present specification, the network-compatible printer 51 and the printers 52, 53, . . . n connected to the printer 51 are collectively referred to as a printer group. Of the printer group, printers close to the Internet 55 are referred to as upstream printers, and printers distant from the Internet 55 are referred to as downstream printers. Communication is established between the network-compatible printer 51 and the downstream network-incompatible printers 52, 53, . . . n through use of the same protocol as a common protocol used in establishing connection between a host and a printer in a one-to-one relationship through a serial or parallel interface.

In addition to the original printer function, the network-compatible printer 51 has the function of managing the downstream printers 52, 53, . . . n and of connecting these printers to the Internet 55 (hereinafter referred to as a "printer management function"). The printer management function has the following two processing functions. The first processing function is a function of examining the performance attributes of each of the downstream printers 52, 53, . . . n and reporting the result of such examination to the host 54 (hereinafter referred to as "examination processing"). The second processing function is a function of transferring a print job received from the host 54 to a printer selected from the printer group (hereinafter referred to as "transfer processing"). The transfer processing includes an operation for selecting a printer on the basis of the performance attributes of each printer (hereinafter referred to as a "determination operation"). The details of these processing and operations will be described later.

Figure 13:
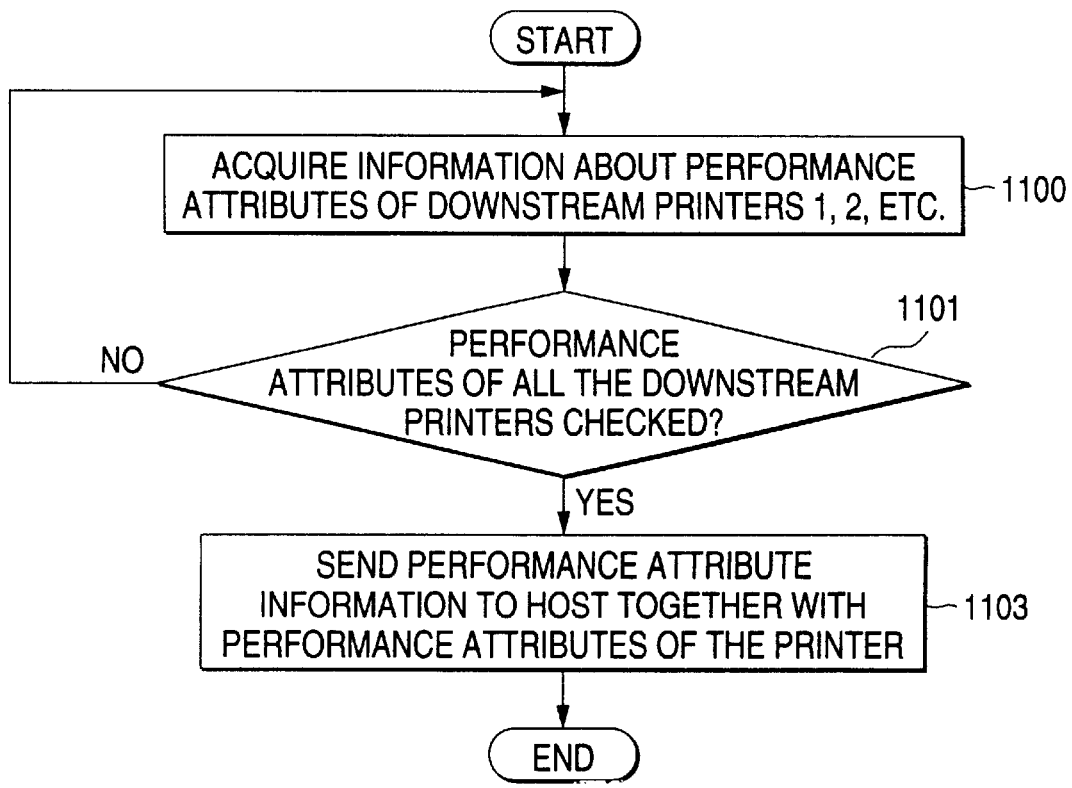
FIG. 13 is a flowchart regarding examination processing performed by the network-compatible printer.

FIG. 13 is a flowchart regarding examination processing performed by the network-compatible printer.

During examination processing, the network-compatible printer 51 inquires about the performance attributes of each printer, such as all setting items and the range of settings, from the downstream printers 52, 53, . . . n and stores the thus-acquired information (1100). The term "setting item" used herein means predetermined items representing the type of attribute of the printer, e.g., a print color, a resolution, and a paper size. Further, the term "range of settings" used herein means the range of values which can be set for each setting item. For example, in the case of a certain type of color printer, the range of settings implies monochrome or color for the print color, 300 or 600 dpi for the resolution, and letter, envelope, B5-size, or A4-size for the paper size. The network-compatible printer 51 determines whether or not all the downstream printers of the printer group are examined (1101). If there are still some unexamined printers, the network-compatible printer 51 continues examining the performance attributes of the printers. When all the printers have been examined, the network-compatible printer 51 sends to the host information including the performance attributes of all the printers of the printer group and the performance attributes of the network-compatible printer 51 (1103).

The examination processing may be performed, e.g., when the network-compatible printer is first connected to the host 54 or when the host 54 requires the network-compatible printer to report the performance attributes of the printers. Alternatively, the examination processing may-be performed when the network-compatible printer 51 starts up or when any of the downstream printers 52, 53, . . . n starts up after booting of the network-compatible printer 51. Further, so long as the performance attributes of the downstream printers are examined and stored at regular intervals after the network-compatible printer 51 has started up, the result of such examination may be sent to the host 54 when the network-compatible printer is connected to the host 54 or when the host 54 requires the network-compatible printer 51 to report the performance attributes of the printers.

Figure 14:
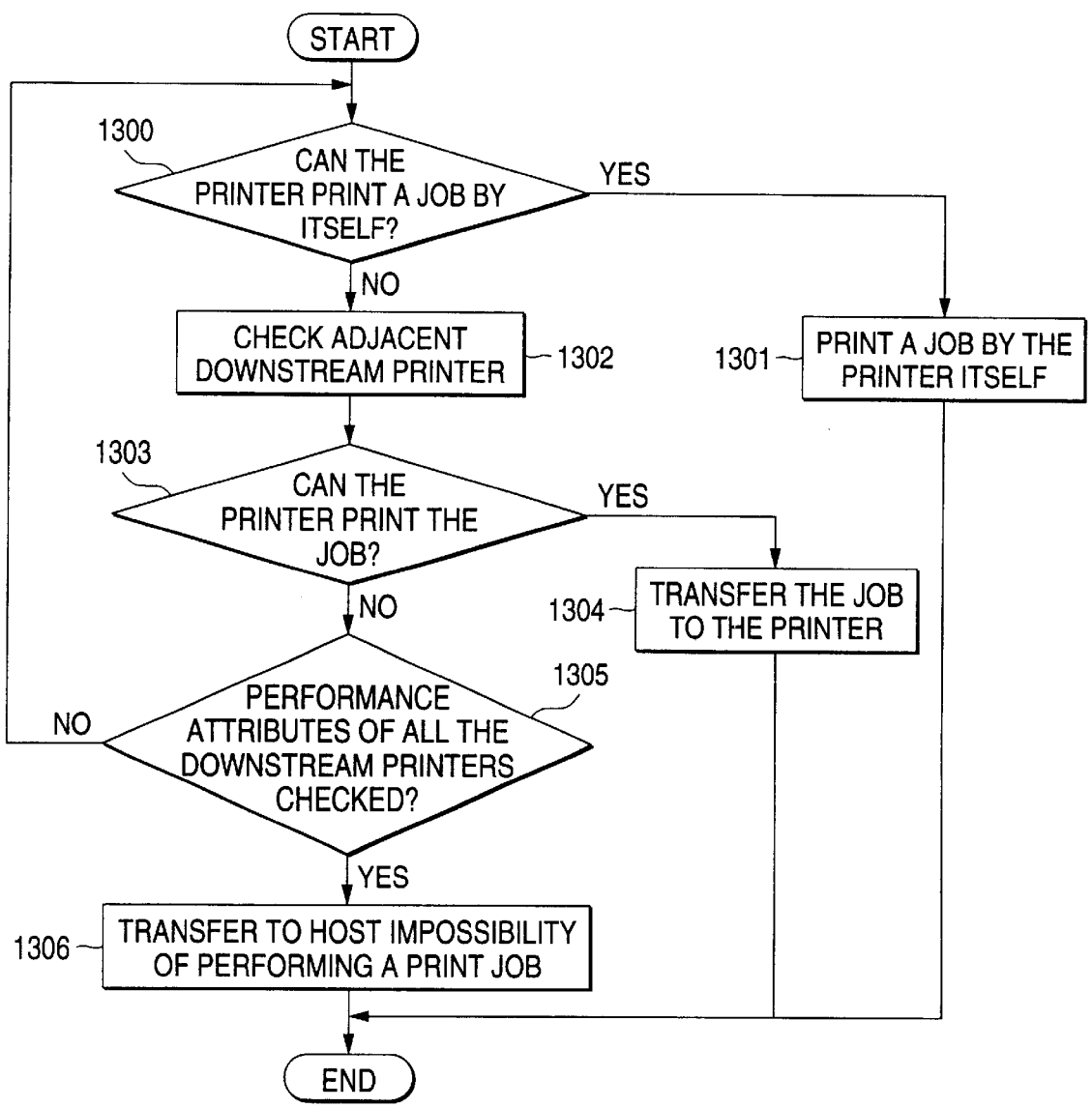
FIG. 14 is a flowchart regarding the transfer processing performed by the network-compatible printer.

FIG. 14 is a flowchart regarding the transfer processing performed by the network-compatible printer 51.

The operation of a driver of the network-compatible printer 51 that has received a print job will be described by reference to FIG. 14.

Upon receipt of a print job from the host 54, the network-compatible printer 51 analyzes the contents of the print job and determines whether or not the performance attributes of the printer 51 enable performance attributes of the print job (1300). If the printer 51 can perform the print job, the printer 51 processes the data of the received job and performs a printing operation (1301).

If the printer 51 determines that the printer cannot perform print the print job because of incompatible performance attributes (or even when a sufficient resource for processing the currently-received job cannot be ensured, because the printer 51 is now processing another job), the printer 51 checks the performance attributes of any one of the downstream printers 52, 53, . . . n within the printer group stored through examination processing (1302) and determines whether or not the received job can be received in light of the performance attributes of the thus-checked printer (1303). If the performance attributes of the print job is determined to be possible as a result of such check, the print job is transferred to the printer, where the print job is performed (1304). In contrast, if the performance attributes of the print job is impossible in light of the performance attributes of the printer (or because of insufficient resources), the performance attributes of the other downstream printers is checked one after another (1305). If a usable printer is found, the print job is transferred to the printer. If performance attributes of the print job is determined to be impossible even after checking all the printers within the printer group, the network-compatible printer 51 notifies the host 54 of the impossibility of performing the print job (1306).

Figure 15:
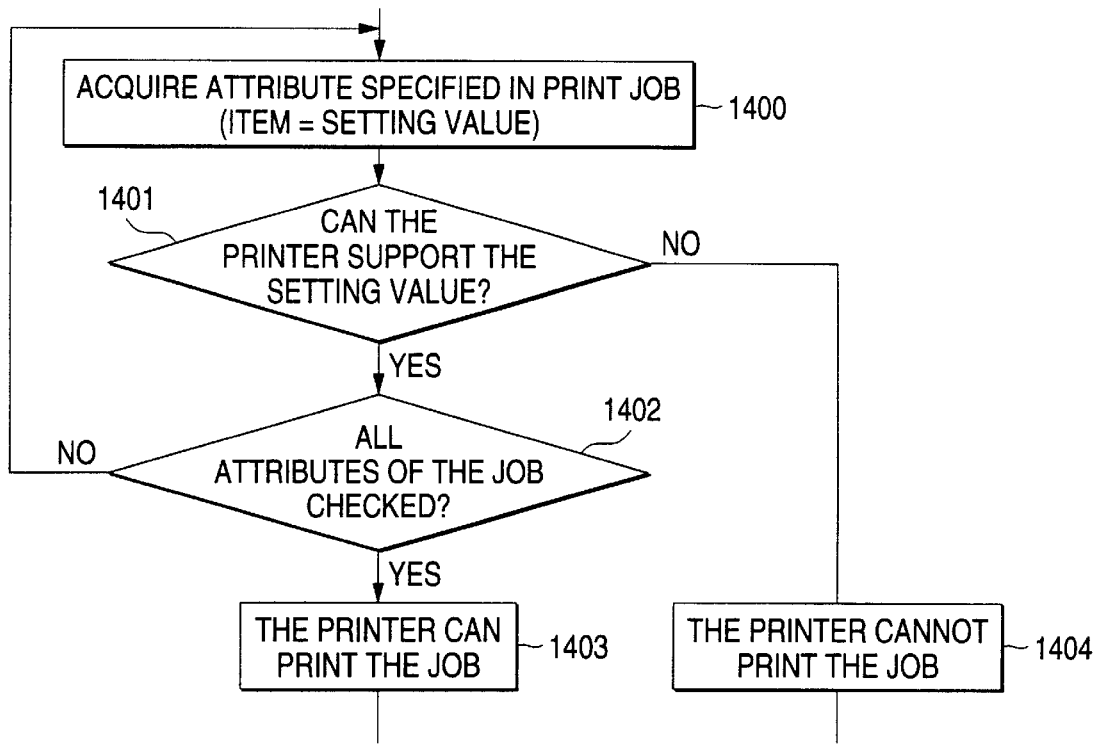
FIG. 15 shows the details of the determination processing performed in steps 1300 and 1303 of the flowchart shown in FIG. 14.

FIG. 15 shows the details of the determination processing performed in steps 1300 and 1303 of the flowchart shown in FIG. 14.

Even in either step 1300 or 1303, the network-compatible printer 51 performs processing shown in FIG. 15. First, the network-compatible printer 51 checks the details of the print job and acquires a printer attribute specified by the print job (1400). Here, the attribute specified by the print job is typically described in job data in the form of "setting item=setting value." For example, If there is a description "print color=color, resolution=600," the description indicates the necessity of a printer capable of producing a color print at a resolution of 600 dpi.

Next, the network-compatible printer 51 determines whether or not a printer which is stored and is to be determined can support the setting value specified by the job (i.e., the setting value specified by the job is within the range of setting values of the setting items corresponding to the printer) by reference to the performance attributes of the printer to be determined (the printer 51 in step 1300 or a downstream printer to be determined in step 1303) (1401). As a result, for example, if the printer cannot support the print job in such a case where the print job specifies a setting value "print color=color" and where the range of settings of the printer to be determined corresponds to "print color= monochrome," the printer is determined to be unable to print the job (1404).

In contrast, if the printer can support the setting specified by the job in such a case where the range of settings of the printer to be determined corresponds to "print color=color and monochrome" in the foregoing example, the network-compatible printer 51 checks another setting value specified by the print job in the same manner (1402). If the printer can support all the setting values, the printer is determined to be able to print the print job (1403).

Through the foregoing processing operations performed by the network-compatible printer 51, all the printers included in the printer group can be connected to the Internet 55. In this case, the network-incompatible printers 52, 53, ... n provided downstream of the network-compatible printer 51 are in principle only required to perform in the same manner as when they are connected to the host 54 by way of a serial interface or a parallel interface. From the viewpoint of the host 54, the network-compatible printer 51 appears to have the performance attributes of all the printers included in the printer group. Therefore, the host 54 is only required to handle the network-compatible printer 51. However, there is every possibility that the configuration of the printers within the printer group will be modified. Further, according to a change in the configuration of the printer group, the performance attributes of the network-compatible printer 51 also changes from the viewpoint of the host 54. For this reason, a printer driver for use with the network-compatible printer 51 loaded in the host 54 is desirably to be able to flexibly cope with such a variation in the configuration of the printer group.

Figure 16:
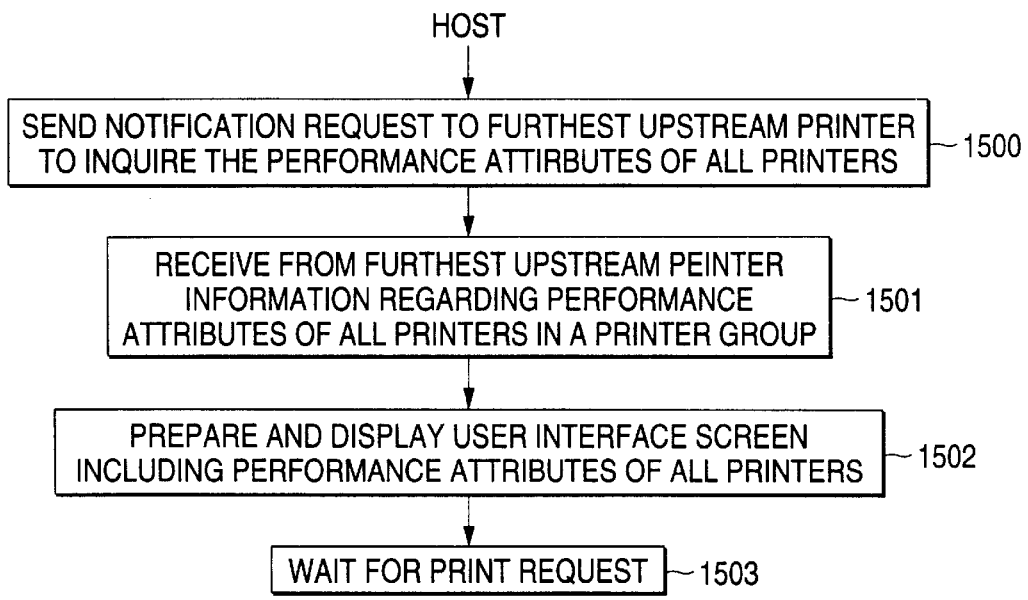
FIG. 16 shows one example of a processing flow of the flexible printer driver loaded into the host.

FIG. 16 shows one example of a processing flow of the flexible printer driver loaded into the host 54.

When started up, the printer driver of the host 54 sends a performance attribute notification request to the furthest network-compatible printer 51 of the printer group (1500). Next, when the performance attributes of all the printers within the printer group are received from the network-compatible printer 51 (1501), the thus-received printer performance is stored, and a user interface screen including the performance attributes of all the printers are prepared and displayed (1502).

Figure 17A:
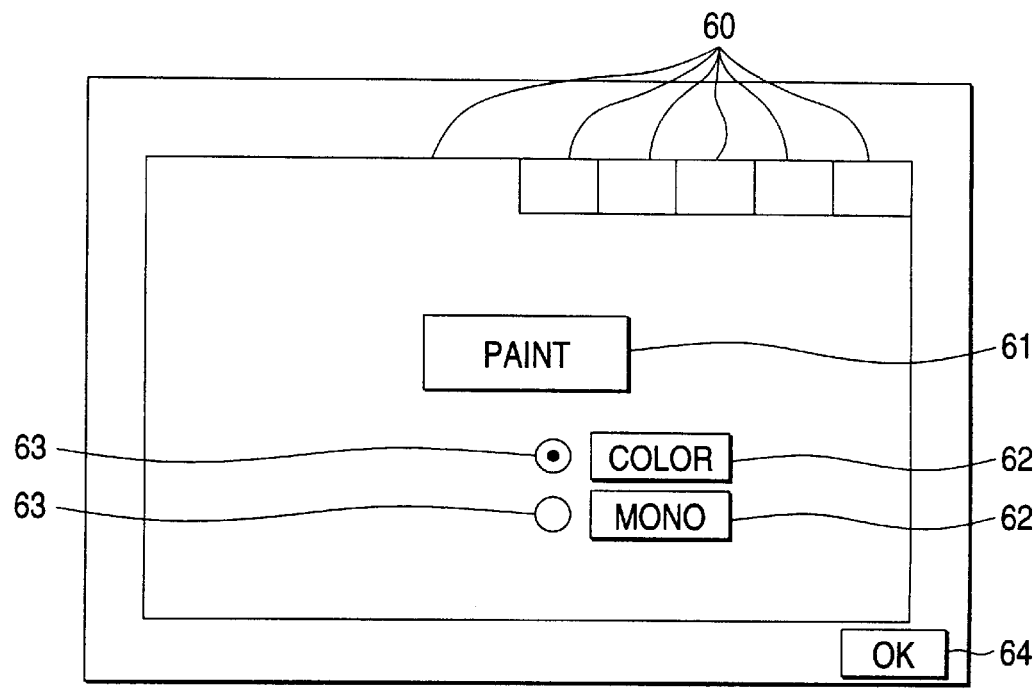
FIGS. 17A and 17B show examples of two types of user interface screens displayed in step 1502.
Figure 17B:
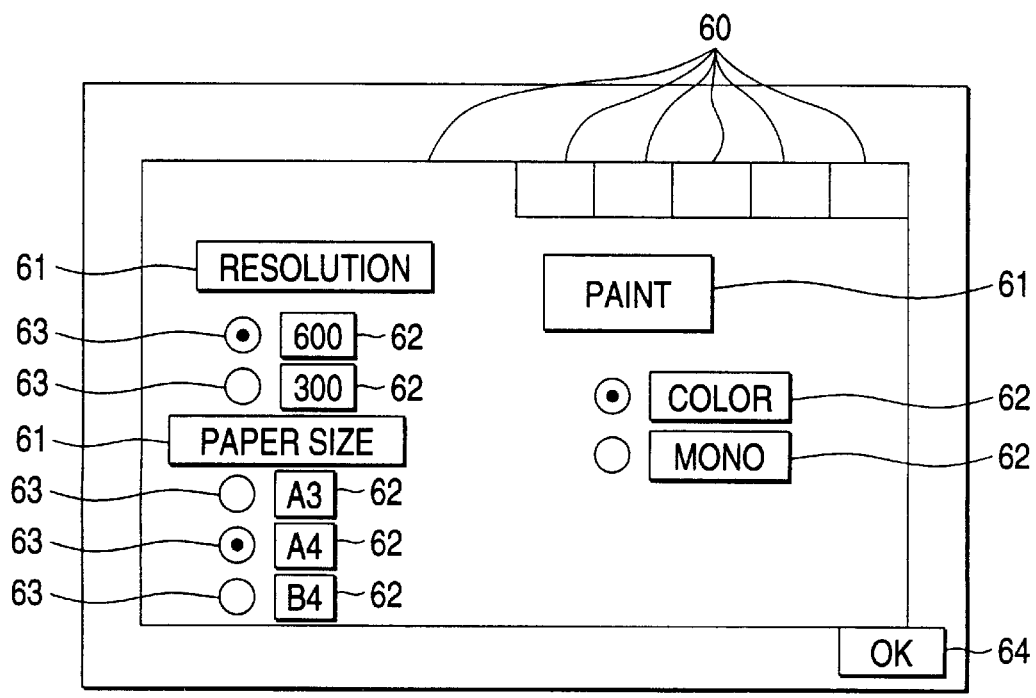

FIG. 17 shows examples of two types of user interface screens displayed in step 1502.

The user interface screen comprises one or a plurality of setting windows 60 which are displayed in a superimposed manner. In each setting window 60, there is (are) one or more than two setting item box(es) 61 representing a setting item. In an example shown in FIG. 17A, there are six setting windows 60, and one setting item box 61 is provided in the currently displayed setting window 60. In contrast, in an example shown in FIG. 17B, there are six setting windows 60, and three setting item boxes 61 are provided in the currently displayed setting window 60. Below each setting item box 61 there are two or three or more setting value boxes 62 for indicating setting values. Radio buttons 63 for use in selecting a setting value are provided beside the respective setting value boxes 62.

At the beginning of startup, the printer driver has only information regarding a framework used for creating a user interface screen such as that shown in FIG. 17. At this stage, the number of the setting windows 60 provided within the user interface screen, the number of the setting item boxes 61 provided in each of the setting windows 60, the number of setting value boxes 62 provided below each of the setting item boxes 61, and the details of each setting item box 61 and those of the setting value box 62 remain undetermined.

Upon receipt of the performance attributes of all the printers included in the printer group in step 1501, the printer driver determines the number of setting windows 60, the number of setting item boxes 61 provided in each setting window 60, and the number of setting value boxes 62 provided below each setting item box 61 according to the number of setting items included in the performance attribute information and the number of setting values of each setting item. The title of each setting item included in the performance attribute information is entered into each setting item box 61, and a setting value of each setting item included in the performance attribute information is entered into each setting value box 62, thus preparing a user interface screen such as that shown in FIG. 17. For example, a setting item "PAINT" shown in FIG. 17A indicates a print color, and a setting value "COLOR" indicates any of the printers in the printer group capable of producing a color print. Further, a setting item "MONO" indicates any of the printers in the printer group capable of producing a monochrome print. A setting item "RESOLUTION" shown in FIG. 17B indicates a resolution, and setting values "600" and "300" provided below the setting item indicates that only two types of resolutions are selectively available. A setting item "PAPER SIZE" indicates a paper size, and setting values "A3," "A4," and "B4" indicate that only these three types of paper sizes are selectively available. A desired setting value can be selected by clicking the radio button 64 of the setting value through use of a mouse. Further, the radio button clicked by the mouse is filled with a black dot.

When the user clicks an "OK" button 64 on the user interface screen through use of the mouse, the printer driver stores the thus-selected value as a specified printer attribute. The processing then proceeds to step 1503, and the printer driver waits for a print request from the user. Upon receipt of a print request from the user, the printer driver converts the stored printer attribute and document data to be printed into print job data which can be interpreted by the network-compatible printer 51. The thus-converted print job data are transmitted to the network-compatible printer 51.

As has been mentioned above, the printer driver can flexibly cope with the performance attributes of the printer group.

Provided below is one specific example of request and performance attribute information exchanged among the host 54, the network-compatible printer 51, and the downstream network-incompatible printers 52, 53, ... n.

First, there is provided below an example of a performance attribute notification request sent to the network-compatible printer 51 from the host 54.

@EJL INQUIRE ALL RANGE<LF>
Here, "@EJL" is a prefix related to a specific job control language to be used. A term "INQUIRE" represents a command code related to a performance attribute request, and a term "ALL RANGE" represents a parameter used for specifying all setting items. The statement provided above signifies a request to the network-compatible printer 51 to answer all these setting items.

Upon receipt of the foregoing request, the network-compatible printer 51 inquires about performance attributes of each of the downstream printers 52, 53, . . . n. The inquiry request is also written into the same statement as is the performance attribute notification request.

For example, the following performance attribute information is sent back to the network-compatible printer 51 from each of the downstream printers 52, 53, . . . n.
    @EJL ANSWER ALL RANGE<LF>
    @EJL RANGE RESOLUTION=600/300<LF>
    @EJL RANGE PAINT=MONO<LF>
    @EJL RANGE PAPER SIZE=A4/B4<LF>
Here, a term "ANSWER" in the first statement is a command code for performance attribute notification. The statement signifies a declarative statement representing notification of answers to all the setting items. In the second and subsequent statements, a term "RANGE" is a command code signifying that the range of a setting value of the setting item is as follows. A parameter which follows "RANGE" and has a form of "title of setting item=setting value 1/setting value 2/ . . . ." signifies that setting values which can be selected for the setting item corresponding to the "title of setting item" are "Setting 1," "Setting 2,". . . In this example, there are selectably available resolutions of 600 and 300 dpi, only monochrome for a print color, and A4-size and B4-size for paper sizes.

Upon collecting the performance attribute information from all the downstream printers, the network-compatible printer 51 notifies the host 54 of the thus-collected performance attribute information. The performance attribute information has the same format as that mentioned previously. In this case, after the following first declarative statement
    @EJL ANSWER ALL RANGE<LF>,
the RANGE statements received from the plurality of downstream printers may be sent to the host 54 while they are simply chained together in the order given, e.g., a RANGE statement described in the second and subsequent statements received from the first downstream printer, a RANGE statement described in the second and subsequent statements received from the second downstream printer, . . . Alternatively, the notification statements received from the plurality of downstream printers may be arranged and edited to thus prepare the following new RANGE statement, and the thus-prepared new RANGE statement may be sent to the host.
    @EJL ANSWER ALL RANGE<LF>
    @EJL RANGE RESOLUTION=600/300<LF>
    @EJL RANGE PAINT=COLOR/MONO<LF>
    @EJL RANGE PAPER SIZE=A4/B4/LTR<LF>
    @EJL RANGE ORIENTATION=LAND/PORT<FF>
In the foregoing example, the RANGE statement received from a certain downstream printer has descriptions "PAINT=MONO" and "PAPER SIZE=A4/B4." However, after the contents of the RANGE statement received from another printer having been added to the foregoing RANGE statement, there is edited a new RANGE statement including descriptions "PAINT=COLOR/MONO" and "PAPER SIZE =A4/B4/LTR."

Upon receipt of such performance attribute information, the printer driver of the host 54 extracts titles of setting items and setting values from parameters of each RANGE statement, thus preparing a user interface screen such as that illustrated in FIG. 17. When a print request is input after the OK button on the user interface screen is pressed, print job data are sent to the network-compatible printer 51 from the host 54. Printer attributes included in the print job data are specified by the following statement:
    @EJL SET RESOLUTION=600<LF>
    @EJL SET PAINT=MONO<LF>
    @EJL SET PAPER SIZE=A3<LF>
Here, the term "SET" is a command code signifying that there is specified an attribute represented by a parameter subsequent to SET. In this example, there are specified a resolution of 600 dpi, a monochrome print color, and A4-size paper.

Figure 18:
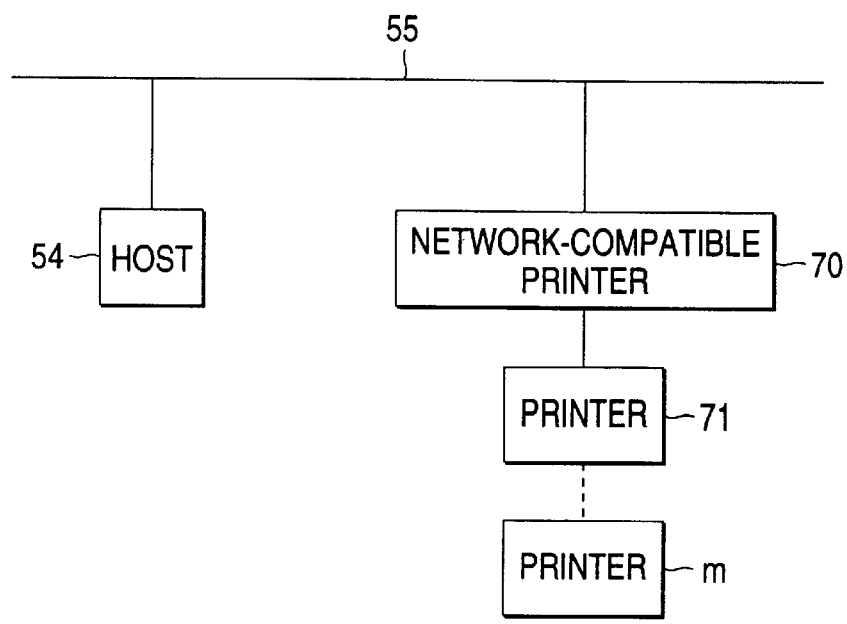
FIG. 18 shows the configuration of a print system according to a sixth embodiment of the present invention.

FIG. 18 shows the configuration of a print system according to a sixth embodiment of the present invention.

Although in the present embodiment the downstream printers 52, 53, . . . n are connected in parallel to the network-compatible printer 51 in the foregoing embodiment, a plurality of printers 70, 71, . . . m may be daisy-chained to the furthest network-compatible printer 70 (in the form of a simple daisy chain formed by means of a bus or a cable) in a serial manner.

However, such a difference in the form of physical connection is not essential for the present invention. In any form of connection, a performance attribute notification request can be transmitted to all the downstream printers 71, . . . m from the furthest upstream printer 70, and the performance attribute information can be collected to the furthest network-compatible printer 70 from all the downstream printers 71, . . . m. For example, in the case of the daisy-chained printers shown in FIG. 18, so long as the information to be transmitted through the daisy chain can pass through the printers included in the daisy chain, the only requirement is that the furthest network-compatible printer 70 have the function of managing the downstream printers in the manner identical with that mentioned in previous embodiments. In contrast, in a case of such a relay transmission method in which each of the daisy-chained printers interprets information received from the adjacent printer and prepares unique information on the basis of such interpretation result and in which the thus-interpreted information is transferred to the adjacent printer on the opposite side, not only the furthest upstream network-compatible printer 70 but also the printers 71 other than the furthest downstream printer "m" are required to have the function of managing downstream printers.

Figure 19:
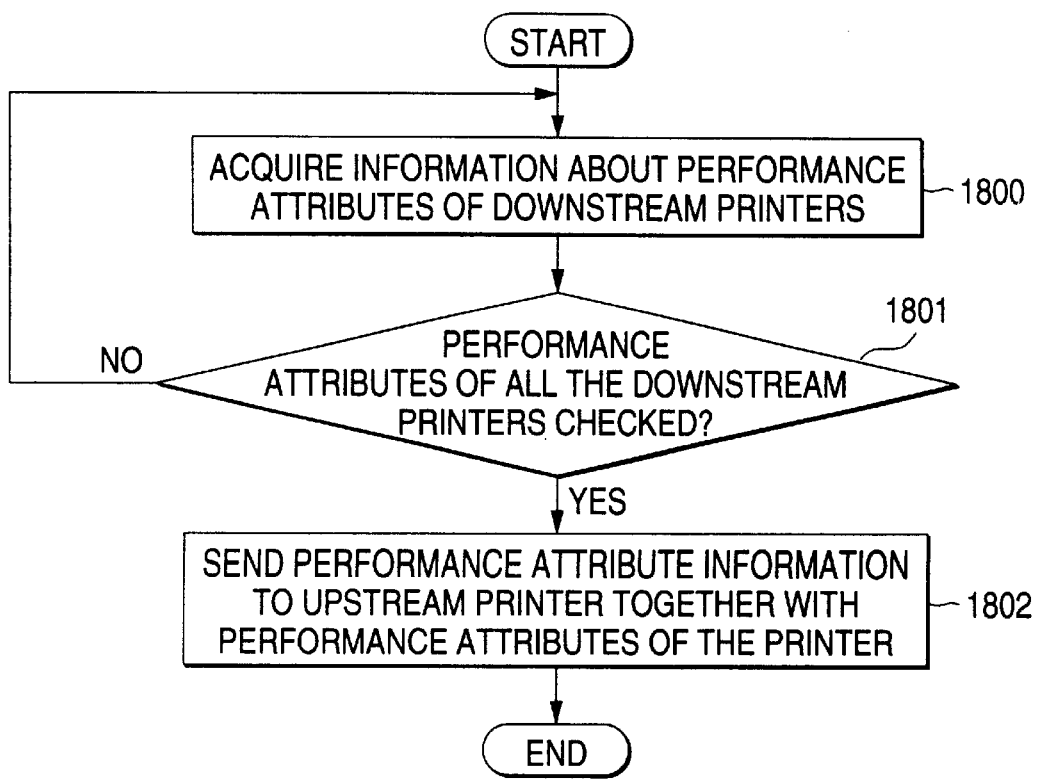
FIG. 19 is a flowchart of the processing of the print system shown in FIG. 18.

In the latter case of relay, the printers 70, 71, . . . other than the furthest downstream printer "m" perform operations such as those shown in FIG. 19 in order to report the performance attributes of the printer group to the host 54.

As shown in FIG. 19, upon receipt of a performance attribute notification request from an upstream printer (i.e., the host 54 in the case of the network-compatible printer 70 or an adjacent upstream printer in the case of other printers 71, . . . ), each of the printers 70, 71, . . . transmits an analogous performance attribute notification request to the adjacent downstream printer, thereby gaining information regarding the performance attributes of an adjacent downstream printer and the performance attributes of subsequent downstream printers within the printer group (1800). A decision is made as to whether or not the performance attributes of all the adjacent downstream printers have been checked (1801).

In the configuration shown in FIG. 18, each printer has only one adjacent downstream printer, and therefore the examination of performance attributes of an adjacent downstream printer is immediately completed. However, if a certain printer is connected to N adjacent printers in parallel in a downstream direction (i.e., the printer divides the daisy chain into N branches), the printer performs the processing defined in step 1800 with respect to N adjacent downstream printers.

After the performance attributes of all downstream printers of the printer group have been checked in the foregoing manner, each printer notifies an adjacent upstream printer of the performance attributes of the adjacent downstream printer and those of subsequent downstream printers together with the performance attributes of the printer itself (1802).

In this way, the information regarding the performance attributes of all the printers 71, . . . m positioned downstream of the furthest upstream network-compatible printer 70 are collected to the furthest upstream network-compatible printer 70, and therefore the network-compatible printer 70 notifies the host 54 of the thus-gained performance attribute information together with the performance attributes of the printer 70 itself (1802).

Subsequently, when the print job data arrives at the network-compatible printer 70 from the host 54, the network-compatible printer 70 determines whether to print the job data itself or to cause any of the downstream printer group to print the job data. In the latter case, the print job data are transferred to an adjacent downstream printer 71. Each printer makes an analogous determination. In a case where a printer of the downstream printer group is caused to print the job data, the print job data are transferred to an adjacent downstream printer. In this way, the print job data are relayed to the printer which is to finally print the print job data. During the course of relay of the print job data, each printer that has received the print job data determines whether the printer itself or any printer of the downstream printer group is suitable for processing the print job data. According to the result of determination of the printer, the printer which finally prints the print job data is determined in a so-called dynamic manner.

In a case where a plurality of printers are grouped in the manner as mentioned previously in the fifth and sixth embodiments, the throughput of the print system can be increased by grouping printers of the same type. In addition, unique effects can be expected from combination of printers of different types as shown in FIGS. 20A to 20C.

Figure 20A:
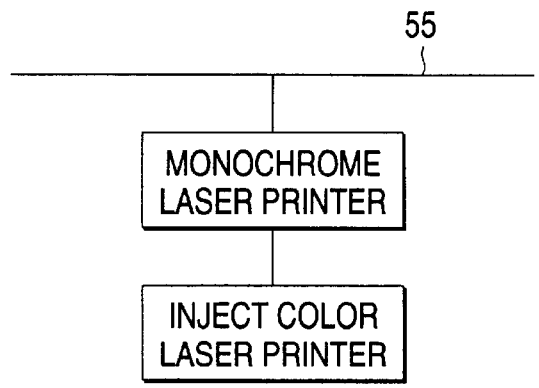
FIG. 20A is a schematic diagram of the print system with a monochrome laser printer is used in combination with a color ink-jet printer.

In an example shown in FIG. 20A, a monochrome laser printer is used in combination with a color ink-jet printer. As a result, a network-compatible printer function, which includes a monochrome high-speed and high-resolution print function provided by the laser printer and a high-quality color print function provided by the color ink-jet printer, can be implemented at significantly less expense than can one network-compatible printer having an analogous function (i.e., a network-compatible color laser printer). So long as the print system is configured so as to be able to utilize a high-level language interpretation function and a rendering function, both of which are usually provided for a laser printer, there can be achieved higher throughput and a shorter host release time than can be achieved when solely an ink-jet printer is used.

Figure 20B:
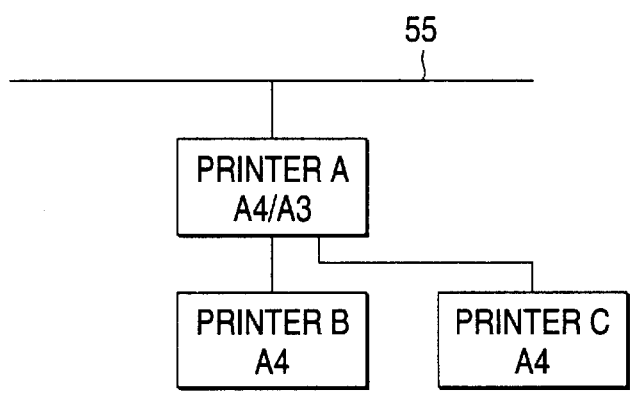
FIG. 20B is a diagram showing an example of the system with different types of printers.

In an example shown in FIG. 20B, one large high-grade printer capable of producing an A3-size print and a plurality of inexpensive printers capable of producing solely A4-size or smaller-sized prints are grouped together. As a result, a high capacity print system capable of producing an A3-size print and a print of A4-sizer or smaller can be constituted at significantly less expense than can a print system comprising a plurality of large high-grade A3-size-capable printers. Further, the A3-size-capable printer and the A4-size-capable printer are provided at the same address on the network, and therefore the print system is easier to use than is a print system having these printers at different addresses on the network.

Figure 20C:
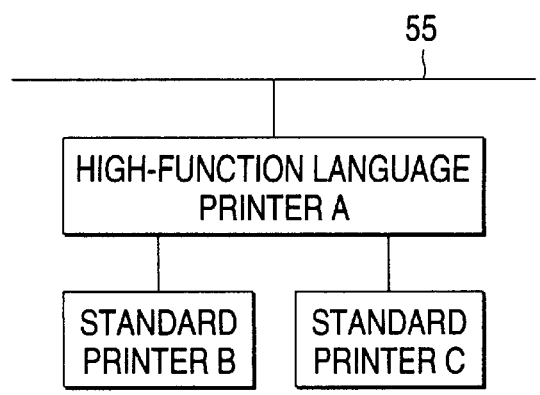
FIG. 20C is a diagram showing another example of the system.

In an example shown in FIG. 20C, a high-function printer capable of rendering a high-function language having a considerably abundant expression capability, e.g., PostScript (Adobe Systems), and standard printers having no function of interpreting such a high-function language are grouped together. As a result, a high capability print system compatible with a high-function language can be constituted at significantly less expense than can a print system comprising a plurality of high-function printers. Further, so long as the print system is configured so that a high-function language interpretation function and a rendering function of the high-function printer can be utilized when a standard printer prints print job data, the standard printer can print an image which is equal in quality to an image produced by a high-function printer.

FIG. 21 shows the flow of processing for determining a printer which is to print a print job when there are two or more printers capable of supporting setting values specified by the job, in the previously-described two embodiments.

As shown in FIG. 21, a check is made as to whether or not there are two or more candidate printers capable of supporting the setting values specified by the job, by examination of the printer itself and all the printers provided downstream of the printer (1900). If there is only one candidate printer, a candidate print job is transferred to the candidate printer (1903). In contrast, if there are two or more candidate printers, the candidate printers satisfying any of the following conditions are eliminated one after another:

1. Printer currently being used
2. Printer having a lesser amount of remaining toner or paper
3. Printer which has been used a greater number of times it is used
4. Printer which incurs greater cost for consumables
5. Color printer when monochrome is specified
6. High-resolution printer when low-resolution is specified
7. Printer located physically distant until only one printer is finally selected (1901). The print job is transferred to the thus-selected printer (1902).

The printer driver of the host is not necessarily required to be capable of such flexible response. For example, the printer driver may also be configured such that setting items and values, which have already been fixed, are displayed on the user interface screen; such that the performance attributes of the printer group are not reported to the host from the network-compatible printer; such that only the network-compatible printer grasps the performance attributes of the printer group; and such that a printer which is to print a print job is selected according to the details of the job.

Further, the printer driver may also be configured such that the network-compatible printer does not notify the host of merely the performance attributes of the entire printer group but notifies the host of the identifiers of individual printers included in the printer group and their performance attributes; such that the user grasps the configuration of printers of the printer group and the performance attributes of each printer, by individually preparing and displaying a user interface screen corresponding to the performance attributes of each printer of the printer group; and such that a print request can be issued by designation of a desired printer. In this case, during a stage in which the printer driver issues print job data, there is specified which of the printers is caused to print a print job. The network-compatible printer can omit troublesome determination processing and can merely transfer the print job data to a specified printer.

In lieu of the network-compatible printer, there can be used a printer manager having only a network connection function and the foregoing function of managing the downstream printers.

The network-compatible printer may be an originally network-compatible printer. However, there may also be employed a printer which become compatible with a network by attachment of an option, such as a network adapter, to an originally network-incompatible printer. The previously-mentioned downstream printer management function may be provided for a printer from the beginning. However, the function is not necessary for the printer. For example, a network adapter may be provided with such a function, or the function may be provided for a printer in the form of add-on ROM or an additional board. Alternatively, a management function program may be loaded into a microcomputer incorporated in a printer, by way of a network or a host.

Figure 22:
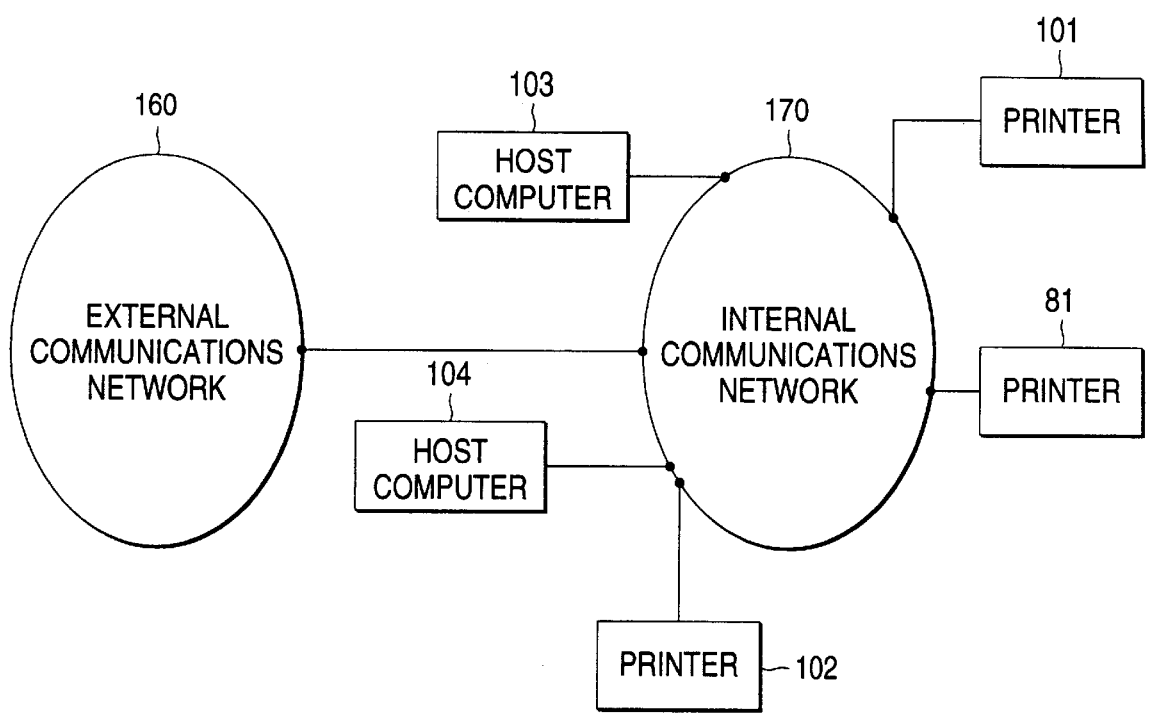
FIG. 22 is a block diagram showing a print system according to a seventh embodiment of the present invention.

FIG. 22 is a block diagram showing a print system according to a seventh embodiment of the present invention.

A printer 81 is connected to a local communications network 170 constituting a certain domain, such as an intranet or a LAN. The communications network 170 is also connected to other printers 101, 102 and host computers 103, 104. Further, the communications network 170 is connected to an external communications network 160, thus constituting a part of a large-scale network such as the Internet.

Figure 23:
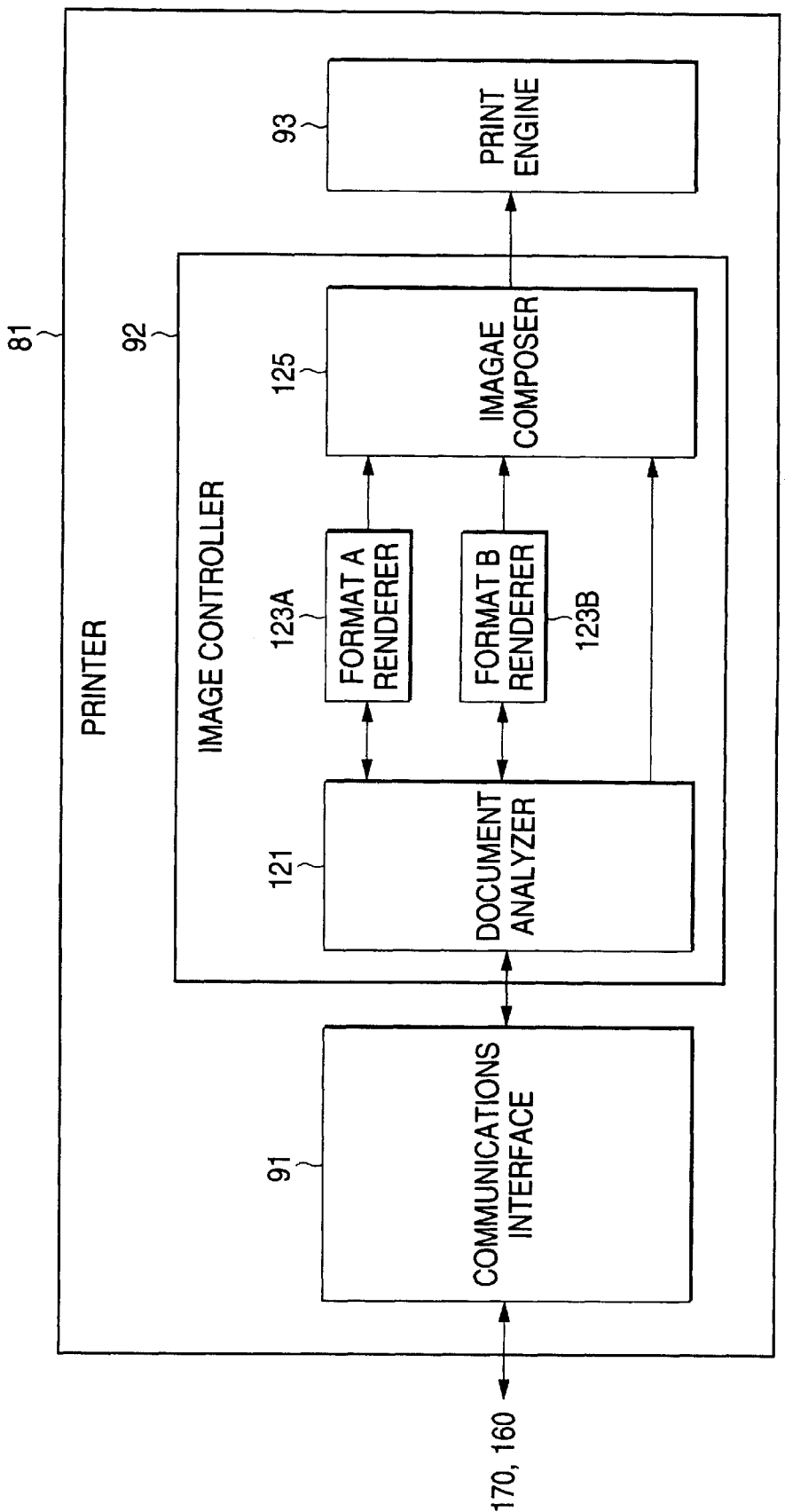
FIG. 23 shows the functional configuration of the printer shown in FIG. 22.

FIG. 23 shows the functional configuration of the printer 81 shown in FIG. 22.

The printer 81 has a communications interface 91, an imaging controller 92, and a print engine 93. The communications interface 91 is connected to the communications network 170 and exchange data with respect to other devices provided on the networks 160, 170. The imaging controller 92 interprets the document data received by way of the communications interface 91 and prepares a print image of the document (i.e., binary raster image data representing whether or not a coloring dot is provided on each pixel position). The print engine 93 inputs the print image prepared by the imaging controller 92 and prints a document image on a sheet through use of a coloring agent and on the basis of the print image.

The imaging controller 92 has a document analyzer 121, renderers 123A, 123B respectively corresponding to certain file formats A, B (e.g., HTML and JPEG), and an image composer 125. Although FIG. 23 shows the renderers 123A, 123B corresponding to two file formats, these two renderers are mere examples. Renderers may be provided so as to correspond to a lesser or greater number of file formats. The entire imaging controller 92 can be implemented in the form of software by means of a microcomputer. Alternatively, at least part of the imaging controller 92 may be implemented through use of a specifically-designed hardware circuit.

The document analyzer 121 analyzes the received document data and identifies the file format of the document data. If the document includes resources of predetermined file formats A, B, the resources are transferred to the renderers 123A, 123B corresponding to the file formats. In contrast, if the document includes a resource of a file format other than the file formats A, B (e.g., file format C), the resource of the file format C is transferred to a device having a renderer corresponding to the file format C among devices (the printers 101, 102 or the computers 103, 104) existing in an identical network domain (i.e., the network 170). The device is then requested to render the resource, and an image resulting from the rendering of the resource is received from the device.

The renderer 123A renders a resource of file format A (e.g., an HTML document), thus preparing a print image of the resource. The renderer 123B renders a resource of file format B (e.g., a JPEG image), thus preparing a print image of the resource. To improve memory efficiency, the renderers 123A, 123B usually divide one page of a document into a plurality of bands, thus preparing a print image for each band. Here, the respective renderers prepare print images with regard to solely corresponding resources, and hence the print images are not complete print images of the composite document.

The image composer 125 acquires the print images prepared by the renderers 123A, 123B for respective bands and the print images which another device prepares in response to a request. The thus-acquired print images are linked together, thus preparing a complete print image for each band.

The print engine 93 receives one after another the complete print images prepared by the image composer 92 for each band and sequentially prints the individual band images on paper, thus preparing a hard copy of each page.

The operation of the print system according to the seventh embodiment will now be described.

The following description is based on the assumption that a certain host computer (e.g., a host computer 103) provided on the networks 160, 170 sends document data written in HTML to the printer 81. Other resources, e.g., a JPG image and a GIFF image, are embedded in the HTML document data. Composite document data are constituted of the HTML document data and the other resources embedded in the HTML document data. The printer 81 performs operations such as those shown in FIG. 24.

First, in step 2301, the communications interface 91 receives the HTML document data and transfers the thus-received data to the imaging controller 92. Subsequently, in step 2302, the communications interface 91 receives other resources embedded in the received HTML document and transfer the resources to the imaging controller 92.

As shown by step 2303, the document analyzer 121 of the imaging controller 92 identifies the file format of each of the resources embedded in the received composite document. In step 2304, a decision is made as to whether or not the thus-identified file format can be rendered by the printer 81 (i.e., the thus-identified file format is format A or format B). If the printer 81 can render the file format, the processing proceeds to step 2305. If not, the processing proceeds to step 2308.

In a case where the processing proceeds to step 2305, the document analyzer 121 transfers the resource of file format A (or B) to the renderer 123A (or 123B). The renderer 123A (or 123B) renders the resources and prepares print data on a band basis, thus dearchiving the print data in memory (not shown).

Figures 25, 26:
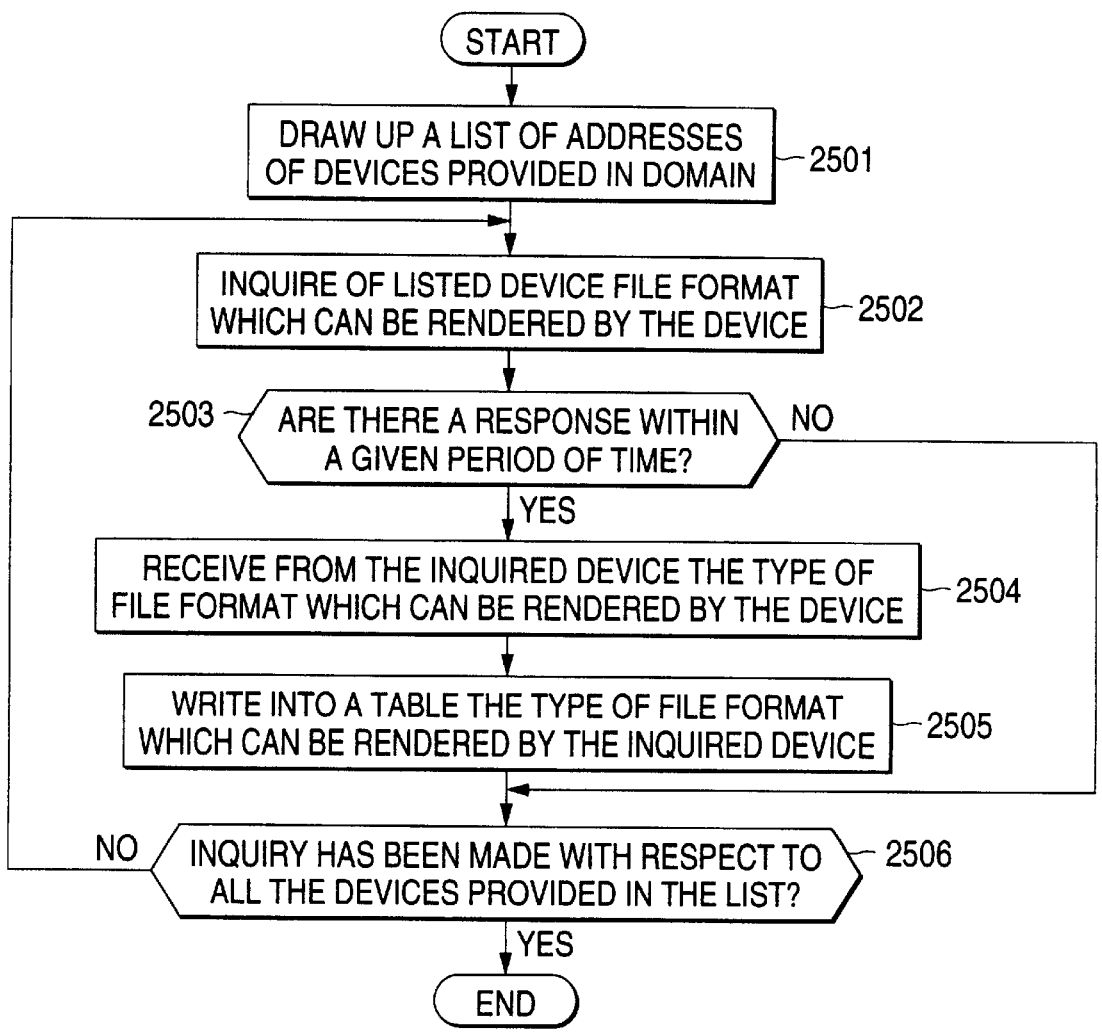
FIG. 25 is a device table which is registered in the printer 81 beforehand.
FIG. 26 is a flowchart showing procedures required to register the device table shown in FIG. 25 into the internal memory of the printer.

In contrast, in a case where the processing proceeds to step 2308, the document analyzer 121 retrieves a device having a renderer corresponding to the file format (e.g., file format C) which cannot be rendered by the printer 81, by reference to a device table such as that shown in FIG. 25 which is registered in the printer 81 beforehand. As shown in FIG. 25, in the device table there are registered identifiers (e.g., IP addresses) of the devices 101, 102, 103, and 104 provided in the same domain where the printer 81 is provided (i.e., within the internal network 170) and file formats which can be rendered by the devices (e.g., extensions of the devices). As a result, if there is a device capable of rendering a file format C within the device table, the processing proceeds to step 2310. If not, the processing proceeds to step 2312.

In a case where the processing proceeds to step 2312, the document analyzer 121 transfers to the renderer 123B an image file, e.g., an image file of a certain picture (e.g., a frame picture), in place of the image of the resource. A print image of the image file is also prepared. In contrast, in a case where the processing proceeds to step 2310, the document analyzer 121 transmits the resource of file format C to the device selected from the device table, by way of the network 170, and requests the device to render the resource and to send back a result of such rendering. For example, in a case where the file format C is GIF, the GIF resource is sent to the printer 102 compatible with GIF. For example, the printer 102 has a configuration analogous to that shown in FIG. 22. The GIF resource requested by the printer 81 is rendered by means of a corresponding renderer, and a print image resulting from a rendering operation is sent back to the printer 81 by way of the network 170. In step 2311, the document analyzer 121 of the printer 81 receives the print image from the printer 102 and dearchives the print image into memory on a band basis.

After all the resources included in the composite document have been rendered for each band of the document, the processing proceeds to step 2306. The image composer 125 integrates the print images of the respective resources, thus dearchiving complete print data of each band on memory. Subsequently, in step 2307, the print engine 93 acquires the complete print image and prints the thus-acquired print image on paper.

FIG. 26 is a flowchart showing procedures required to register the device table shown in FIG. 25 into the internal memory of the printer 81. The registration operation can be performed when the user orders the printer to perform, periodically, at the time of starting up of the printer, or at a suitable opportunity, whenever necessary.

First, in step 2501, the document analyzer 121 of the printer 81 draws up a list of addresses of all the devices 101, 102, 103, and 104 provided within the domain by inquiring, e.g., a router having an identical routing table. In step 2502, the document analyzer 121 inquires of each of the thus-listed devices a file format which can be rendered by the device. If there is an answer to the inquiry from the device within a certain period of time, the document analyzer 121 proceeds to step 2504. The document analyzer 121 receives from the device a notification of the file format which can be rendered by the device. In step 2505, the file format is registered in the device table in such away as to correspond to the address of the device. An inquiry and registration are performed with regard to all the devices provided in the domain. As a result, a device table such as that shown in FIG. 25 is completed.

According to the seventh embodiment, the printer 81 can receive and print a composite document including a plurality of file formats, by utilization of a renderer provided therein or a renderer of another device.

Figure 24:
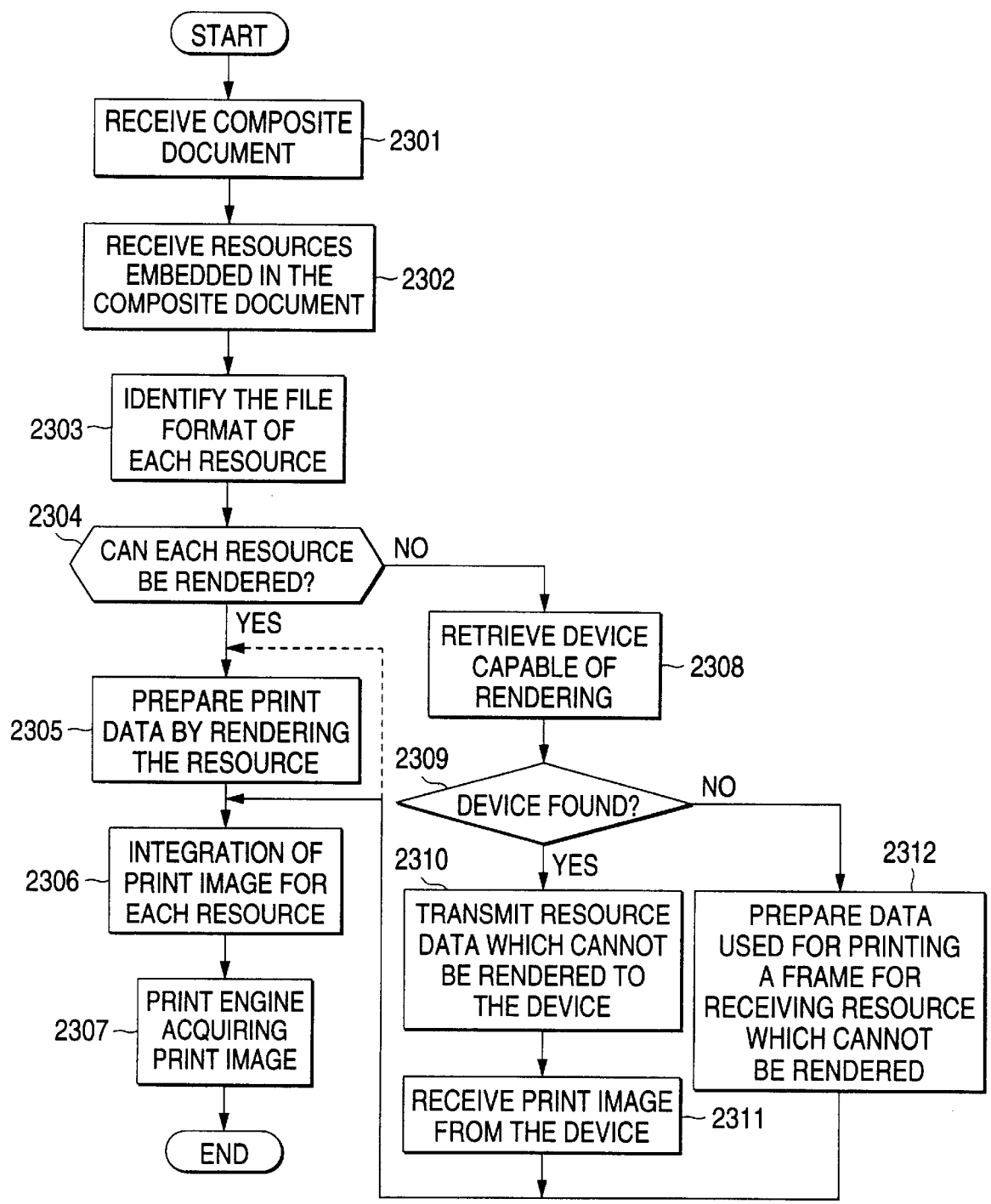
FIG. 24 is a flowchart showing the operations performed by the printer 81.

In the seventh embodiment, in step 2310 shown in FIG. 24, the printer 81 sends to another device the resource of file format C which cannot be rendered by the printer 81 and requests the device to render the resource. However, if another device has a converter capable of converting the file format C into a file format (e.g., format B) which can be rendered by the printer 81, the printer 81 may request, in step 2310, the device not to render the resource but to convert the file format C of the resource to file format B. In such a case, after having receiving the converted resource of file format B in step 2311, the printer 81 proceeds to step 2305 in a manner as indicated by a dotted arrow. In this step, the resource of file format B is rendered by means of the renderer 123B of the printer 81.

Although not shown in FIG. 22, as a matter of course there is included an existing renderer which prepares a print image by interpretation of the data expressed in a specific printer control language. In a case where the printer requests another device to convert a file format in the manner as mentioned previously, the device may convert the file format into the data expressed in a specific printer control language (i.e., data having the same format as those received by an existing printer from the host), and the data may be rendered and printed by means of an existing renderer provided in the printer 81.

Figure 27:
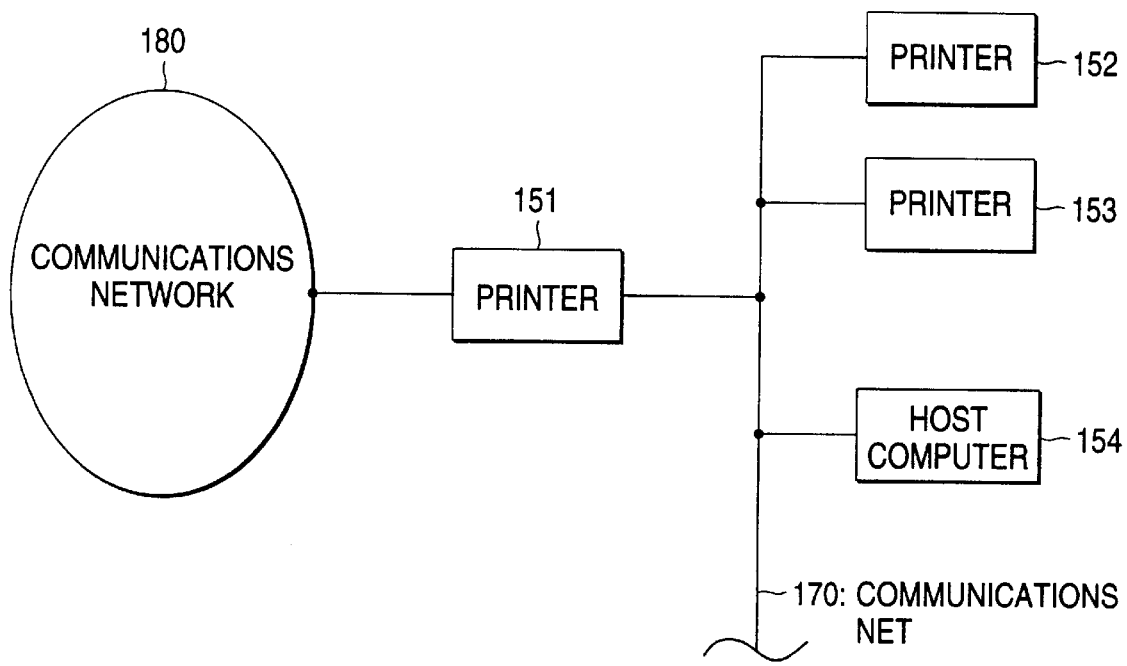
FIG. 27 is a block diagram showing an eighth embodiment of the present invention.

FIG. 27 is a block diagram showing an eighth embodiment of the present invention.

A network 170 constituting a certain domain is connected to a printer 151 according to the present invention and other devices, e.g., printers 152, 153, and a host computer 154. The printer 151 is connected further to an external communications network 180. The printer 151 has such a configuration as that shown in FIG. 22. In a case where composite document data are received from the communications network 180 and where a specific printer which is provided in the domain and is to print the composite document cannot render a certain resource included in the composite document, the printer 151 has a function of retrieving a device capable of rendering the resource (or the foregoing converter) from the devices provided in the domain where the printer 151 itself is also provided. The printer 151 causes the thus-retrieved device to render or convert the resource and to transfer resultant data to the printer which is to print the data. To realize such a function, the printer 151 has a device table which is analogous to that shown in FIG. 25 and which shows the rendering capability of all the devices provided in the domain where the printer 151 itself is also provided. With such a function, a printer server having no printing function can be used in place of the printer 151.

Figure 28:
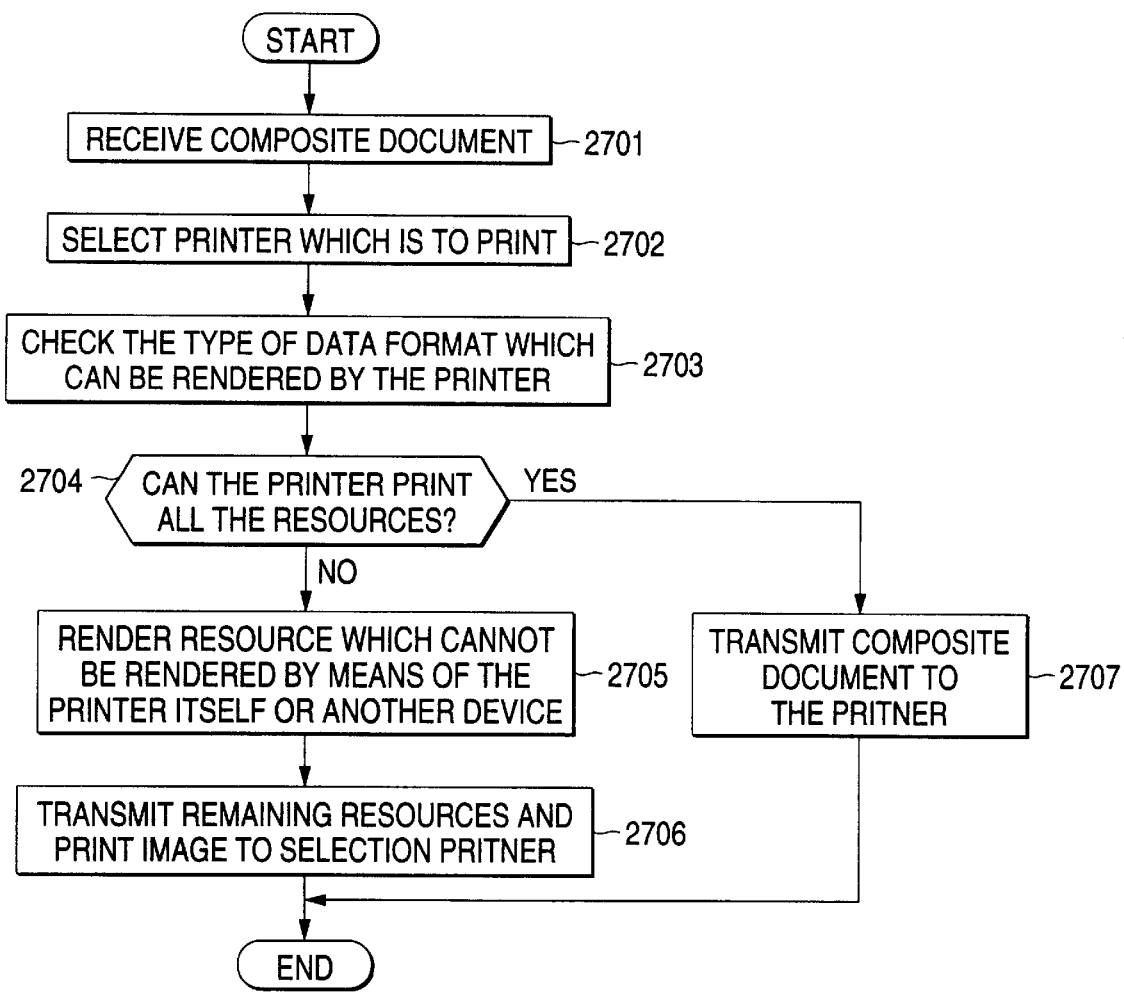
FIG. 28 is a flowchart showing the operation of the printer 151.

The operation of the printer 151 will be described according to the flowchart provided in FIG. 28.

Upon receipt of composite document data from the communications network 180 in step 2701, the printer 151 selects, in step 2702, a printer (e.g., a printer 152)—which is to print the composite document—from the printers 151, 152, and 153 provided in the domain where the printer 151 itself is also provided, on the basis of a destination address included in the composite document data. Next, in step 2703, the printer 151 checks the file format which can be rendered by the thus-selected printer 152, by reference to the pre-registered device table. In step 2704, the printer 152 determines whether or not all the resources included in the composite document can be rendered. As a result, if the resources can be rendered, the processing proceeds to step 2707. If not, the processing proceeds to step 2705.

In step 2707, the printer 151 transfers the composite document data to the selected printer 152. In contrast, if the processing proceeds to step 2705, the printer 151 retrieves a device capable of rendering (or converting) a resource which cannot be rendered by the printer 152, by reference to the device table. The printer 151 transfers the resource to the thus-retrieved device and requests the device to render (or convert) the resource (if the printer 151 itself can render or convert the resource, the printer renders or converts the resource). Subsequently, the processing proceeds to step 2706, and the printer 151 transfers to the printer 152 a resource of the composite document data which can be rendered by the printer 152. Further, in step 2705, a result of such rendering or conversion is also transferred to the printer 152 (a result of rendering or conversion performed by another device may be directly transferred to the printer 152 by bypassing the printer 151). As a result, the printer 152 can print the composite document in a complete form.

Although the preferred embodiments of the present invention have been described above, the present invention is not limited to these embodiments but may be subjected to various modifications.

In the previous embodiments, in order to make an explanation easy to understand, a term "rendering" is explained as meaning preparation of a print image (i.e., a binary raster image used for driving a print engine). However, the term "rendering" is not limited to such a meaning. For example, various forms of image data are prepared until a final print image is formed from a resource, e.g., an intermediate code, an RGB multivalued raster image, or a CMYK multivalued raster image. The renderer used when carrying out the present invention is not limited to any particular type of renderer, so long as it converts a resource of a composite document into image data of any form not dependent on a file format unique to the composite document. The format of image data output from the renderer assumes a tentative format such as the previously-described intermediate code, the RGB multivalued raster image, or the CMYK multivalued raster image. Accordingly, the rendering result obtained when the printer (or printer server) according to the present invention requests another device to render a certain resource is not necessarily required to correspond to a final print image. The rendering result may assume the format of an intermediate code or that of a multivalued raster image, so long as the result is image data which can be finally imaged in the form of a print by means of a printer (or printer server) which is to perform a printing operation.

To make an explanation easy to understand, in the previous embodiments a term "convert" is used in addition to the term "rendering." The term "convert" is used to represent conversion of a resource of a file format which cannot be interpreted by a printer of interest (or a print server of interest) into data of a format which can be interpreted by the printer. However, it is to be noted that a term "rendering" used in claims should include not only the term "rendering" but also the term "convert" used in the previous embodiments.

In the previous embodiments, the printer according to the present invention receives composite document data by way of a communications network or requests another device to render a resource by way of the communications network. However, such communication is not necessarily required to be established by way of such a communications network. Even in a case where a printer (or printer server) according to the present invention is connected to another host computer or printers, the printer (or printer server) according to the present invention can operate in substantially the same manner as it does in the previous embodiments.

Although several preferred embodiments of the present invention have been described, they are intended only for describing the present invention. Therefore, the present invention should not be limited to these embodiments. Within the scope of the present invention, the present invention can be carried out in various other forms which differ from the previously-described embodiments in terms of specific configuration, operation, function, action, and advantageous result.

What is claimed is:

1. A printer comprising:

composite document means for receiving or generating composite document data;

a plurality of renderers which correspond to a plurality of predetermined file formats, and which render, among resources included in the composite document data, resources whose file formats correspond to one another;

an image composer which prepares a final print image by integration of rendering results produced by the plurality of renderers;

a print engine for printing the print image;

a communications interface for connecting the printer to one or more devices in a communicable manner, wherein the composite document means is capable of receiving the decoded document data from any one of the devices by way of the communications interface; and a document analyzer which identifies the file format of resources included in composite document data, wherein in a case where the composite document data include an incompatible file format which is not compatible with any of the renderers of the printer, the document analyzer transfers a resource of the incompatible file format to a device selected from the devices and requests the selected device to render the resource, and wherein upon receipt of a rendering result from the device, the document analyzer transfers the received rendering result to the image composer or the renderer of the printer.

2. The printer according to claim 1, wherein the communications interface has means for connecting to a predetermined communications network.

3. The printer according to claim 1, further comprising device information representing a file format capable of being rendered by the devices; wherein the document analyzer selects a device to which the resource of incompatible file format is to be transferred, by reference to the device information.

4. The printer according to claim 3, further comprising means for preparing the device information.

5. The printer according to claim 1, wherein in a case where the composite document data include an incompatible format which cannot be rendered by any of the renderers, the image composer prepares a final print image by handling the resource of incompatible format as a blank or by replacing the resource with a predetermined proxy image.

6. The printer according to claim 1, wherein the plurality of renderers render solely a resource of a file format specified by the user among the resources included in the composite document data.

7. A printer comprising:

a communications interface which connects to one or more devices in a communicable manner;

composite document means for receiving or producing composite document data;

a document analyzer which identifies the file format of resources contained in the composite document data, transfers a resource of at least one file format to a selected device provided in another device, requests the selected device to render the thus-transferred resource, and receives a rendering result from the device;

an image composer for preparing a final print image from the result of such rendering; and a print engine for printing the print image.

8. The printer according to claim 7, wherein the communications interface has means for connecting to a predetermined communications network.

9. The printer according to any one of claims 7 and 8, wherein the printer is provided with a renderer compatible with a predetermined file format, and wherein the document analyzer transfers to the renderer a resource of file format which is compatible with the renderer among the resources included in the composite document data and transfers to the selected device resources of file formats which are incompatible with the renderer.

10. The printer according to any one of claims 7 and 8, further comprising device information representing a file format capable of being rendered by the devices, wherein the document analyzer selects a device to which the resource of incompatible file format is to be transferred, by reference to the device information.

11. The printer according to claim 10, further comprising means for preparing the device information.

12. The printer according to any one of claims 7 and 8, wherein in a case where the composite document data include an incompatible format which cannot be rendered by the printer or by any of the renderers, the image composer prepares a final print image by handling the resource of incompatible format as a blank or by replacing the resource with a predetermined proxy image.

13. The printer according to any one of claims 7 and 8, wherein the document analyzer causes the printer or the device to render only a resource of file format specified by the user among the resources included in the composite document data.

14. A printer server comprising:

a communications interface which connects in a communicable manner to another device including one or more printers;

composite document means for receiving or generating composite document data;

means for selecting from the device a printer which is to print the composite document data; and a document analyzer which identifies the file format of a resource contained in the composite document data and transfers to the thus-selected printer a resource of a file format capable of being rendered by the selected printer, and which supplies to the selected printer a rendering result regarding a resource of a file format incapable of being rendered by the selected printer.

15. The printer server according to claim 14, wherein the communications interface has means for connecting to a predetermined communications network.

16. The printer server according to any one of claims 14 and 15, wherein the document analyzer transfers to the device selected from the devices a resource of file format which cannot be rendered and requests the selected device to render the resource, and wherein upon receipt of a rendering result from the device, the document analyzer transfers the received rendering result to the selected printer.

17. The printer server according to any one of claims 14 and 15, wherein the document analyzer transfers to the device selected from the devices a resource of file format which cannot be rendered and requests the selected device to render the resource and to transfer the result of rendering to the selected printer.

18. The printer server according to any one of claims 14 and 15, wherein the printer server is provided with a renderer compatible with a predetermined file format, and wherein the document analyzer transfers to the renderer a resource of file format which is compatible with the renderer among the resources included in the composite document data and transfers to the selected device resources of file formats which are incompatible with the renderer.

19. The printer server according to any one of claims 14 and 15, further comprising device information representing a file format capable of being rendered by the devices, wherein the document analyzer selects a device to which the resource of incompatible file format is to be transferred, by reference to the device information.

20. The printer server according to claim 19, further comprising means for preparing the device information.

21. The printer server according to any one of claims 14 and 15, further comprising:

an image composer for preparing a final print image from the result of such rendering; and a print engine for printing the print image.

22. A print system comprising:

a plurality of devices which are connected together in a communicable manner and which include one or more printers, wherein at least one of the printers included in the devices includes composite document means for receiving or producing composite document data;

a plurality of renderers which correspond to a plurality of predetermined file formats, and which render, among resources included in the composite document data, resources whose file formats correspond to one another;

an image composer for preparing a final print image by integration of a plurality of rendering results produced by the renderers;

a print engine for printing the print image;

a communications interface for connecting the printer to the plurality of devices in said communicable manner, wherein the composite document means is capable of receiving the decoded document data from any one of the devices by way of the communications interface; and a document analyzer which identifies the file format of resources included in composite document data, wherein in a case where the composite document data include an incompatible file format which is not compatible with any of the renderers of the printer, the document analyzer transfers a resource of the incompatible file format to a device selected from the devices and requests the selected device to render the resource, and wherein upon receipt of a rendering result from the device, the document analyzer transfers the received rendering result to the image composer or the renderer of the printer.

23. A print system comprising:

a plurality of devices which are connected together in a communicable manner and which include one or more printers, wherein at least one of the printers included in the devices includes composite document means for receiving or producing composite document data;

a document analyzer which identifies the file format of resources contained in the composite document data, transfers a resource of at least one file format to a selected device provided in another device, requests the selected device to render the thus-transferred resource, and receives a rendering result from the device;

an image composer for preparing a final print image from the result of such rendering; and a print engine for printing the print image.

24. A print system comprising:

a plurality of devices which are connected together in a communicable manner and which include one or more printers, wherein at least one of the printers included in-the devices includes composite document means for receiving or generating composite document data;

means for selecting from the device a printer which is to print the composite document data; and a document analyzer which identifies the file format of a resource contained in the composite document data and transfers to the thus-selected printer a resource of a file format capable of being rendered by the selected printer, and which supplies to the selected printer a rendering result regarding a resource of a file format incapable of being rendered by the selected printer.

25. A computer-readable medium having recorded thereon a computer program for causing a computer provided in a printer to operate as composite document means for receiving or generating composite document data;

a plurality of renderers which correspond to a plurality of predetermined file formats, and which render, among resources included in the composite document data, resources whose file formats correspond to one another; and a document analyzer which identifies the file format of resources included in composite document data, wherein in a case where the composite document data include an incompatible file format which is not compatible with any of the renderers of the printer, the document analyzer transfers a resource of the incompatible file format to a device connected to the printer via a communications interface and requests the device to render the resource, and wherein upon receipt of a rendering result from the device, the document analyzer transfers the received rendering result to an image composer or one of the renderers of the printer.

26. A computer-readable recording medium having recorded thereon a computer program for operating a computer, which is provided in a printer and can communicate with one or more devices, as composite document means for receiving or producing composite document data; and a document analyzer which identifies the file format of resources contained in the composite document data, transfers a resource of at least one file format to a selected device provided in another device, requests the selected device to render the thus-transferred resource, and receives a rendering result from the device.

27. A computer-readable recording medium having recorded thereon a computer program for operating a computer, which is provided in a printer and can communicate with one or more devices, as composite document means for receiving or generating composite document data;

means for selecting from the device a printer which is to print the composite document data; and a document analyzer which identifies the file format of a resource contained in the composite document data and transfers to the thus-selected printer a resource of a file format capable of being rendered by the selected printer, and which supplies to the selected printer a rendering result regarding a resource of a file format incapable of being rendered by the selected printer.

* * * * *